US011228346B2

United States Patent
Gutman et al.

(10) Patent No.: US 11,228,346 B2
(45) Date of Patent: Jan. 18, 2022

(54) BEAM CAPABILITY ENHANCEMENTS USING MULTIPLE RECEIVE PORTS

(71) Applicant: QUALCOMM Incorporated, San Diego, CA (US)

(72) Inventors: Igor Gutman, Ramat Gan (IL); Gideon Shlomo Kutz, Ramat Hasharon (IL); Ronen Greenberger, Modiin (IL); Assaf Touboul, Netanya (IL)

(73) Assignee: Qualcomm Incorporated, San Diego, CA (US)

( * ) Notice: Subject to any disclaimer, the term of this patent is extended or adjusted under 35 U.S.C. 154(b) by 105 days.

(21) Appl. No.: 16/592,666

(22) Filed: Oct. 3, 2019

(65) Prior Publication Data

US 2021/0105046 A1 Apr. 8, 2021

(51) Int. Cl.
| H04B 7/04 | (2017.01) |
| H04L 5/00 | (2006.01) |
| H04B 7/0408 | (2017.01) |
| H04W 72/02 | (2009.01) |
| H04W 72/08 | (2009.01) |
| H04B 7/0413 | (2017.01) |

(52) U.S. Cl.
CPC ......... H04B 7/0408 (2013.01); H04L 5/0023 (2013.01); H04W 72/02 (2013.01); H04W 72/082 (2013.01); H04B 7/0413 (2013.01)

(58) Field of Classification Search
CPC .... H04B 7/0408; H04B 7/0617; H04L 5/0023
See application file for complete search history.

(56) References Cited

U.S. PATENT DOCUMENTS

| 2013/0223251 | A1* | 8/2013 | Li | H04B 7/0619 370/252 |
| 2017/0181132 | A1* | 6/2017 | Xiao | H04L 5/0023 |
| 2017/0303263 | A1* | 10/2017 | Islam | H04W 16/28 |
| 2019/0082429 | A1 | 3/2019 | Xiao et al. | |
| 2019/0229776 | A1* | 7/2019 | Cao | H04B 7/06 |
| 2020/0091988 | A1* | 3/2020 | Zhang | H04B 7/0695 |

FOREIGN PATENT DOCUMENTS

| WO | WO-2017192889 A1 | 11/2017 |
| WO | WO-2019130938 A1 | 7/2019 |

OTHER PUBLICATIONS

International Search Report and Written Opinion—PCT/US2020/053859—ISA/EPO—dated Feb. 10, 2021.

* cited by examiner

*Primary Examiner* — Hoon J Chung
(74) *Attorney, Agent, or Firm* — Holland & Hart LLP

(57) ABSTRACT

Methods, systems, and devices for wireless communications are described. A wireless device may receive, using a first receive port, a first signal within a first frequency band, where the first receive port may be associated with a first receive beam. The wireless device may also receive, using a second receive port, a second signal within the first frequency band concurrently with receiving the first signal, where the second receive port may be associated with a second receive beam. After receiving the first and second signals, the wireless device may process both signals. Processing the signals may include decoding both of the signals, measuring both of the signals, and/or decoding one of the signals and measuring the other of the signals. To support concurrent reception over multiple receive beams within a single frequency band, the wireless device may employ an idle antenna panel and corresponding receive ports.

26 Claims, 12 Drawing Sheets

BEAM CAPABILITY ENHANCEMENTS USING MULTIPLE RECEIVE PORTS

FIELD OF TECHNOLOGY

The following relates generally to wireless communications and more specifically to beam capability enhancements using multiple receive ports.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communication systems may operate in millimeter wave (mmW) frequency ranges (e.g., 28 GHz, 39 GHz, 60 GHz, etc.). Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Beamforming may apply multiple antennas (e.g., antenna arrays or panels) at the transmitter and receiver to form transmit beams and receive beams, respectively. For example, a transmitting device may transmit a beamformed transmission to a receiving device via a transmit beam, and the receiving device may receive the beamformed transmission via a receive beam. Use of beamforming in communication environments presents challenges for maintaining robust and flexible communication links.

SUMMARY

The described techniques relate to improved methods, systems, devices, and apparatuses that support beam capability enhancements using multiple receive ports. A wireless device may include multiple receive ports and may implement configurability of the multiple receive ports across multiple frequency bands. For example, the wireless device may have a first set of receive ports (e.g., a first receive port associated with horizontal polarization and a second receive port associated with vertical polarization) and a second set of receive ports (e.g., a third receive port associated with horizontal polarization and a fourth receive port associated with vertical polarization). The wireless device may be configurable to employ the first set of receive ports in a first frequency band and the second set of receive ports in a second frequency band, or, when configured to communicate using a single frequency band (e.g., the first frequency band), employ the first and second set of receive ports for the same or different carriers in the single frequency band. In some cases, the wireless device determines that it is configured to communicate using a single frequency based on a modem at the wireless device being programmed in a mode that supports reception over a single frequency band. In some cases, the wireless device determines that it is configured to communicate using a single frequency band based on being configured by a wireless communications network to communicate using a single frequency band.

When configured to employ the first and second sets of receive ports in the same frequency band, the wireless device may receive a transmission via multiple receive beams—e.g., via a first receive beam associated with the first set of receive ports and a second receive beam associated with the second set of receive port. The wireless device may receive multiple transmissions via the multiple receive beams—e.g., a first transmission may be received via the first receive beam and a second transmission may be received via the second receive beam. The first and second receive beams may be associated with different carriers in the single frequency band, or the same carrier, in some cases.

A method for wireless communication at a UE is described. The method may include receiving, using a first receive port, a first signal within a first frequency band, where the first receive port is associated with a first receive beam, receiving, using a second receive port, a second signal within the first frequency band concurrently with receiving the first signal using the first receive port, where the second receive port is associated with a second receive beam, and processing the first signal received using the first receive port and the second signal received using the second receive port.

An apparatus for wireless communication at a UE is described. The apparatus may include a processor, memory in electronic communication with the processor, and instructions stored in the memory. The instructions may be executable by the processor to cause the apparatus to receive, using a first receive port, a first signal within a first frequency band, where the first receive port is associated with a first receive beam, receive, using a second receive port, a second signal within the first frequency band concurrently with receiving the first signal using the first receive port, where the second receive port is associated with a second receive beam, and process the first signal received using the first receive port and the second signal received using the second receive port.

Another apparatus for wireless communication at a UE is described. The apparatus may include means for receiving, using a first receive port, a first signal within a first frequency band, where the first receive port is associated with a first receive beam, means for receiving, using a second receive port, a second signal within the first frequency band concurrently with receiving the first signal using the first receive port, where the second receive port is associated with a second receive beam, and means for processing the first signal received using the first receive port and the second signal received using the second receive port.

A non-transitory computer-readable medium storing code for wireless communication at a UE is described. The code may include instructions executable by a processor to receive, using a first receive port, a first signal within a first frequency band, where the first receive port is associated with a first receive beam, receive, using a second receive port, a second signal within the first frequency band concurrently with receiving the first signal using the first receive port, where the second receive port is associated with a second receive beam, and process the first signal received using the first receive port and the second signal received using the second receive port.

Some examples of the method, apparatuses, and non-transitory computer-readable medium described herein may further include operations, features, means, or instructions for transmitting, to a base station, an indication that the UE supports receiving over multiple receive beams within multiple frequency bands.

Some examples of the method, apparatuses, and non-transitory computer-readable medium described herein may further include operations, features, means, or instructions for receiving, from a base station, a first configuration for a first transmission within the first frequency band and a second configuration for a second transmission within the first frequency band, where the first signal corresponds to the first transmission and the second signal corresponds to the second transmission.

In some examples of the method, apparatuses, and non-transitory computer-readable medium described herein, the processing may include operations, features, means, or instructions for generating first data and second data based on decoding the first signal and the second signal.

In some examples of the method, apparatuses, and non-transitory computer-readable medium described herein, the first transmission may be transmitted over a first component carrier and the second transmission may be transmitted over a second component carrier.

In some examples of the method, apparatuses, and non-transitory computer-readable medium described herein, the processing may include operations, features, means, or instructions for combining the first signal and the second signal into a combined signal, and decoding the combined signal.

In some examples of the method, apparatuses, and non-transitory computer-readable medium described herein, the first transmission may be transmitted over first resources and the second transmission may be transmitted over second resources that at least partially overlap with the first resources.

Some examples of the method, apparatuses, and non-transitory computer-readable medium described herein may further include operations, features, means, or instructions for determining that the UE may be configured to receive communications over or one or more component carriers within the first frequency band, and configuring the second receive port to be coupled with the first local oscillator based on the determining.

Some examples of the method, apparatuses, and non-transitory computer-readable medium described herein may further include operations, features, means, or instructions for configuring the first receive port and a third receive port to receive communications within the first frequency band, and configuring the second receive port and a fourth receive port to receive communications within a second frequency band.

Some examples of the method, apparatuses, and non-transitory computer-readable medium described herein may further include operations, features, means, or instructions for determining that the UE may be configured to receive communications over or one or more component carriers within the first frequency band, and configuring the second receive port and the fourth receive port to receive communications within the first frequency band based on the determining.

Some examples of the method, apparatuses, and non-transitory computer-readable medium described herein may further include operations, features, means, or instructions for receiving an indication from a base station to configure the first receive port and the third receive port to receive communications within the first frequency band, where the first receive port and the third receive port may be configured to receive communications within the first frequency band based on the indication.

In some examples of the method, apparatuses, and non-transitory computer-readable medium described herein, the first receive port may be configured to receive vertically polarized signals and the second receive port may be configured to receive horizontally polarized signals.

In some examples of the method, apparatuses, and non-transitory computer-readable medium described herein, the first receive port may be coupled with a first antenna panel configured to form the first receive beam and the second receive port may be coupled with a second antenna panel configured to form the second receive beam.

Some examples of the method, apparatuses, and non-transitory computer-readable medium described herein may further include operations, features, means, or instructions for receiving, from a base station, a configuration for a transmission within the first frequency band, the first signal and the second signal corresponding to the transmission, where the processing includes.

Some examples of the method, apparatuses, and non-transitory computer-readable medium described herein may further include operations, features, means, or instructions for selecting the first receive beam for receiving subsequent transmissions from the base station based on the measuring, and receiving, using the first receive port or the second receive port via the first receive beam, a subsequent transmission from the base station based on the selecting.

Some examples of the method, apparatuses, and non-transitory computer-readable medium described herein may further include operations, features, means, or instructions for selecting the second receive beam for receiving subsequent transmissions from the base station based on the measuring, and receiving, using the first receive port or the second receive port via the second receive beam, a subsequent transmission from the base station based on the selecting.

Some examples of the method, apparatuses, and non-transitory computer-readable medium described herein may further include operations, features, means, or instructions for receiving a set of transmissions from a base station over a set of receive beams, the first signal and the second signal corresponding to transmissions of the set of transmissions and the set of receive beams including the first receive beam and the second receive beam, where the processing includes.

Some examples of the method, apparatuses, and non-transitory computer-readable medium described herein may further include operations, features, means, or instructions for selecting a receive beam of the set of receive beams for receiving subsequent transmissions from the base station based on the measuring, and receiving, using the first receive port or the second receive port via the receive beam, a subsequent transmission from the base station based on the selecting.

Some examples of the method, apparatuses, and non-transitory computer-readable medium described herein may further include operations, features, means, or instructions for selecting two receive beams of the set of receive beams for receiving subsequent transmissions from the base station based on the measuring, receiving, using the first receive port via one of the two receive beams, a subsequent first transmission from the base station based on the selecting, and receiving, using the second receive port via the other one of the two receive beams, a subsequent second transmission from the base station based on the selecting.

Some examples of the method, apparatuses, and non-transitory computer-readable medium described herein may further include operations, features, means, or instructions for performing, using the second receive port concurrently with receiving a set of signals using the first receive port, a search of a set of receive beams for receiving transmissions within the first frequency band, where the set of signals include the first signal, and where the second signal may be received using the second receive port during the search.

Some examples of the method, apparatuses, and non-transitory computer-readable medium described herein may further include operations, features, means, or instructions for receiving, from a base station, a configuration for a transmission within the first frequency band, where the first signal and the second signal corresponding to the transmission, and where the processing includes, decoding the first signal received using the first receive port via the first receive beam, and measuring channel state information for the second signal received using the second receive port via the second receive beam.

Some examples of the method, apparatuses, and non-transitory computer-readable medium described herein may further include operations, features, means, or instructions for outputting a first data stream based on decoding the first signal, selecting the second receive beam for receiving subsequent transmissions from the base station based on the measuring, and receiving, using the first receive port or the second receive port via the second receive beam, a subsequent transmission from the base station based on the selecting.

In some examples of the method, apparatuses, and non-transitory computer-readable medium described herein, the first signal corresponds to a horizontally polarized version of a transmission from a base station and the second signal corresponds to a vertically polarized version of the transmission, where the processing may include operations, features, means, or instructions for measuring first channel state information for the first signal and second channel state information for the second signal.

Some examples of the method, apparatuses, and non-transitory computer-readable medium described herein may further include operations, features, means, or instructions for selecting the second receive port for receiving the transmission from the base station based on the measuring, and receiving, using the second receive port via the second receive beam, a subsequent transmission from the base station based on the selecting.

DETAILED DESCRIPTION

Figure 1:
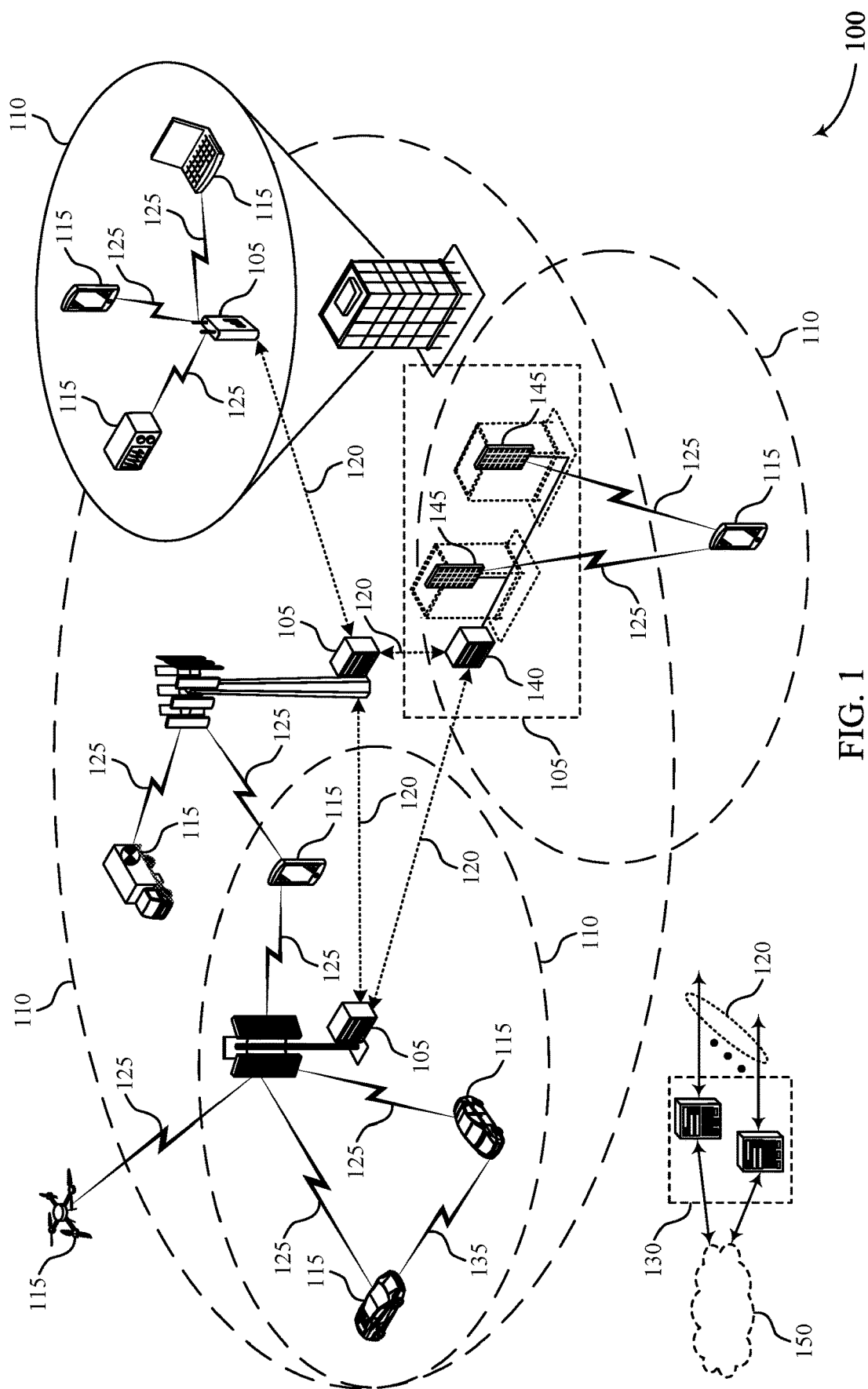
FIG. 1 illustrates an example of a wireless communications system that supports beam capability enhancements using multiple receive ports in accordance with various aspects of the present disclosure.

A wireless device may include multiple sets of receive ports, where each receive port includes components for receiving and demodulating (e.g., downconverting) radio frequency (RF) signals of a wireless transmission. In some cases, each of the sets of receive ports may be associated with communications within one of a set of frequency bands used for communication. For example, a first set of receive ports (e.g., associated with a first antenna panel) may be coupled with a first local oscillator tuned for a first frequency band and a second set of receive ports set (e.g., associated with a second antenna panel) may be coupled with a second local oscillator tuned for a second frequency band. That is, each of the first or second local oscillators include components for generating a signal that can be used to remove a carrier frequency from a signal (e.g., downconvert) detected by an antenna panel. The local oscillator(s) may include one or more oscillators for performing direct conversion to a baseband signal, or multi-stage conversion (e.g., superheterodyning). In some cases, a first antenna panel associated with the first set of receive ports may be configurable to receive via a single receive beam and a second antenna panel associated with the second set of receive ports may be configurable to receive via a single receive beam (which may be a same or different receive beam as the receive beam used by the first antenna panel).

In some cases, a wireless device having multiple sets of receive ports may be capable of or configured to use a subset of the sets of receive ports while communicating in a wireless communications system. For example, a wireless device having multiple sets of receive ports (e.g., a first set and a second set of receive ports) may be configured to operate in a first mode that enables the wireless device to use one set of receive ports (e.g., coupled with an antenna panel supporting one or more polarizations) at a time while communicating in a wireless communications system. Additionally, or alternatively, a wireless device having multiple sets of receive ports may be configured to operate in a second mode that enables the wireless device to use multiple sets of receive ports concurrently (e.g., a first set of receive ports coupled with a first antenna panel may be configured for receiving over a first frequency band while a second set of receive ports coupled with a second antenna panel may be configured for receiving over a second frequency band). In some cases, the device may have a first set of receive ports capable of communications in a first frequency band and a second set of receive ports capable of concurrent communications in a second frequency band. However, a wireless device may be configured for communication over a single frequency band for a variety of reasons such as deployment of bands within the communication system, channel conditions, or system load.

In some examples, the wireless device may be capable of utilizing only one set of receive ports for receiving communications at a time when transmissions are transmitted within a single frequency band, leaving one set of receive ports in an unused (or idle) state—e.g., when the wireless device is configured in the second mode, the other set of receive ports may not be configured for the frequency band used for communicating with the wireless device. Thus, when the wireless device is configured for communication over a single frequency band, the wireless device may receive communications using a single, active antenna panel—e.g., because a receive chain associated with the unused antenna panel may be configured for a different frequency band. Also, the wireless device may be limited to receiving signals via a single receive beam using the active antenna panel—e.g., because an antenna panel may be capable of receiving signals from one direction at a time.

As discussed herein, a wireless device that includes two or more sets of receive ports may be configurable to employ multiple sets of receive ports to receive transmissions within a single frequency band. For example, the wireless device may utilize a receive port or set of receive ports (e.g., that would be otherwise idle if not configurable for concurrent use in the same frequency band) to support concurrent receiving and/or processing of one or more transmissions via multiple receive beams when the one or more transmissions are transmitted within a single frequency band. For instance, a wireless device that is configured to receive communications within a first frequency band may receive signals that are detected by a first antenna panel using a first set of receive ports configured for the first frequency band, while a second set of receive ports (e.g., coupled with a second antenna panel) that are configurable for use in a second frequency band may be otherwise unused if communications in the second frequency band are not currently configured for the wireless device. In some cases, the wireless device may configure or reconfigure the second set of receive ports for the first frequency band so that the wireless device may receive signals that are detected by the second antenna panel within the first frequency band using the second set of receive ports concurrently with receiving the signals that are detected by the first antenna panel using the first set of receive ports. The first and second antenna panels may employ the same or different receive beams, and the first and second sets of receive ports may be used to obtain different versions of the received signals for further processing (e.g., combined or separate decoding).

In some cases, to support the usability of receive ports or sets of receive ports that would be otherwise idle, the wireless device may include one or more sets of receive ports configurable for more than one frequency band. For example, a wireless device may be configured with a first receive port or first set of receive ports that is capable of receiving over a first frequency band. The wireless device may also be configured with a second receive port or second set of receive ports that is capable of receiving over either the first or second frequency band. In some cases, the first receive port or set of receive ports may be capable of receiving over either the first or second frequency band.

In some examples, a set of receive ports may be associated with an antenna panel. For example, a wireless device may include a first antenna panel associated with a first and second receive port and a second antenna panel associated with a third and fourth receive port. In some cases, each antenna panel may support multiple polarizations (e.g., horizontal and vertical polarizations). The wireless device may be configured (e.g., by the network or during pre-deployment device programming or packaging) to receive communications within a single frequency band. That is, in some cases, the wireless device may be configured to receive communications using either the first set of receive ports within a first frequency band or the second set of receive ports within a second frequency band, but not both. In some examples, the wireless device may be configured to receive communications using the first set of receive ports within the first frequency band, and the second set of receive ports may be placed into an idle or inactive state based on the configuration.

In some cases, the wireless device may determine that the second set of receive ports and/or the second antenna panel are unused (e.g., in an idle state)—e.g., based on determining that the wireless device includes two antenna panels and is configured to receive over only the first frequency band. After determining that the second set of receive ports is in an idle state, the wireless device may reconfigure the second set of receive ports for the first frequency band—e.g., by configuring a radio frequency (RF) chain that processes signals received using the second set of receive ports to perform downconversion using a local oscillator associated with the first frequency band (e.g., the same local oscillator as the first set of receive ports, or a different local oscillator tuned to a same frequency).

After reconfiguring the second set of receive ports, the wireless device may use the extra receive ports to support the simultaneous reception and/or processing of transmissions using the first set of receive ports via a first receive beam and using the second set of receive ports via a second receive beam when the transmissions are transmitted within a single frequency band. By supporting the concurrent receiving and/or processing of transmissions received within a single frequency band via multiple receive beams, throughput may be increased—e.g., by receiving multiple transmissions via multiple receive beams, by enabling a search for a preferred receive beam to be performed without interrupting reception, etc. Also, a search for a preferred receive beam may be accelerated—e.g., by simultaneously searching half of the receive beam candidates using one receive port or set of receive ports and the other half of the receive beam candidates using the other receive port or set of receive ports.

For example, the wireless device may use one or more of the first set of receive ports and one or more of the second set of receive ports to support the simultaneous search for a preferred receive beam within a frequency band—e.g., by concurrently forming different receive beams at an antenna panel associated with the first set of receive ports and an antenna panel associated with the second set of receive ports. In another example, the wireless device may use one or more of the first set of receive ports and one or more of the second set of receive ports to support the simultaneous reception of one or more transmissions transmitted within a single frequency band. For instance, the wireless device may receive a first component carrier within a frequency band via first receive beam and a second component carrier within the frequency band via second receive beam. By receiving a first component carrier via first receive beam and a second component carrier via second receive beam instead of receiving the second component carrier via the first receive beam, the wireless device may avoid interference that affects the second component carrier and the first receive beam. In another instance, the wireless device may receive a first transmission via first receive beam and a redundant transmission via second receive beam, where the first transmission and the redundant transmission may both be concurrently transmitted over the same component carrier.

In another example, the wireless device may use one of the first set of receive ports and one of the second set of receive ports to support the reception of a transmission via a first receive beam concurrently with a search for a preferred receive beam. In yet other examples, the wireless device may select a receive beam for receiving a transmission and/or subsequent transmissions using one of the first set of receive ports or the second set of receive ports by supporting the simultaneous reception of the transmission via a first receive beam and the second receive beam, when the transmission is transmitted within a single frequency band.

Aspects of the disclosure are initially described in the context of a wireless communications system and a wireless communications subsystem. Specific examples are then described of a wireless device and a process for beam capability enhancements using multiple receive ports. Aspects of the disclosure are further illustrated by and described with reference to apparatus diagrams, system diagrams, and flowcharts that relate to beam capability enhancements using multiple receive ports.

FIG. 1 illustrates an example of a wireless communications system that supports beam capability enhancements using multiple receive ports in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted using an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

UEs 115 may be configured with a variety of configurations of antenna panels and receive ports. For example, a UE 115 may be configured with two receive ports. A receive port may be associated with a configuration of antennas and/or an antenna panel located at the UE 115. In some cases, a first receive port is coupled with a first antenna or antenna set in an antenna panel associated with horizontally polarized transmissions and a second receive port is coupled with a second antenna or antenna set in the antenna panel associated with vertically polarized transmissions. Horizontally polarized transmissions may be associated with electromagnetic radiation that travels in a first direction while oscillating within a first plane (e.g., parallel with the ground). Vertically polarized transmission may be associated with electromagnetic radiation that travels in the first direction while oscillating within a second plane (e.g., perpendicular to the ground and/or to the first plane). In some cases, horizontally and vertically polarized transmissions may be referred to as orthogonal. Orthogonal transmissions may be combined without affecting (e.g., substantially interfering with) one another; thus, a transmitted signal that includes orthogonal polarizations may be deconstructed by a receiver into two different signals, which may be separately processed and/or decoded. In some cases, the first and second receive ports may be configured to receive transmissions that arrive via a first receive beam. That is, the two receive ports may be able to receive a single dual polarized receive beam per symbol. In some cases, each of the antenna sets are referred to as antenna panels themselves.

Alternatively, a UE 115 may be configured with four receive ports. In some cases, the UE 115 is configured with a first set of receive ports that includes a first receive port coupled with a first antenna set in an antenna panel associated with vertically polarized transmissions and a second receive port coupled with a second antenna set in the antenna panel associated with horizontally polarized transmissions. The UE 115 may also be configured with a second set of receive ports that includes a third receive port coupled with a first antenna set in a second antenna panel associated with horizontally polarized transmissions and a fourth receive port coupled with a second antenna set in the second antenna panel associated with vertically polarized transmissions. In some cases, the first and second antenna panels may be configured to receive transmissions that arrive from different directions (e.g., via different receive beams). In some cases, each of the antenna sets are referred to as antenna panels themselves. In some cases, the first set of receive ports may be configured for operation within a first frequency band and the second set of receive ports may be configured for operation within a second frequency band.

In some examples, a UE 115 including four receive ports may be configured (e.g., by the network or pre-deployment) to operate in a first mode that supports the concurrent reception of a first transmission using one or more of the first set of receive ports via a carrier within a first frequency band and a second transmission using one or more of the second set of receive ports via a carrier within a second frequency band. In other examples, the UE 115 may be configured (e.g., by the network or pre-deployment) to operate in a second mode that supports reception within only one of the first or second frequency bands. In some cases, when the UE 115 operates in the second mode, the unused set of receive ports may be deactivated, placed in an idle state, and/or inaccessible for communications the UE 115.

Thus, even when configured with multiple sets of receive ports, the UE 115 may not support the concurrent reception of one or more transmissions via multiple receive beams using multiple receive ports when the one or more transmissions are transmitted within a single frequency band. For example, the UE 115 may be unable to use two receive beams to receive transmission of data within a single frequency band. In some cases, receiving the one or more transmissions may include passing signals detected at the antennas associated with a receive port to an RF chain and/or circuitry for processing the signals. Processing the one or more transmissions may include downconverting, amplifying, demodulating, decoding, and/or measuring the detected signals.

A UE 115 that includes more than two receive ports and is configured to receive transmissions within a single frequency band may utilize a receive port that would be otherwise idle to support concurrent receiving and/or processing of one or more transmissions transmitted over multiple receive beams when the one or more transmissions are transmitted within a single frequency band. In some cases, to support the reconfiguration of idle receive ports, the UE 115 may be configured with a first antenna panel that is capable of receiving over one or both of a first or second frequency band and associated with a first set of receive ports (e.g., a first receive port and a second receive port). The UE 115 may also be configured with a second antenna panel that is capable of receiving over one or both of the first or second frequency band and associated with a second set of receive ports (e.g., a third receive port and a fourth receive port).

Figure 2:
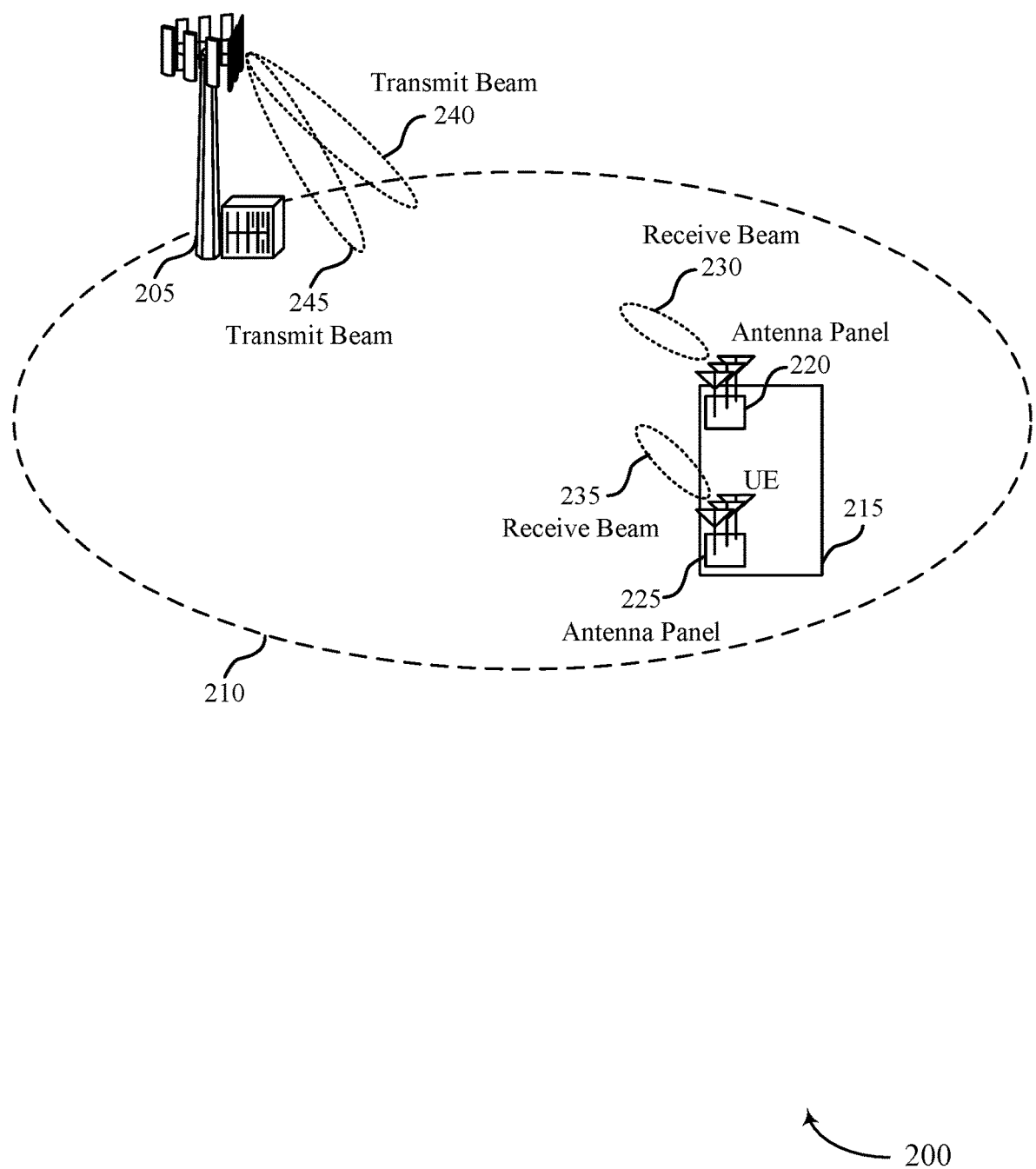
FIG. 2 illustrates aspects of a wireless communications subsystem that supports beam capability enhancements using multiple receive ports in accordance with various aspects of the present disclosure.

FIG. 2 illustrates aspects of a wireless communications subsystem that supports beam capability enhancements using multiple receive ports in accordance with various aspects of the present disclosure.

Wireless communications subsystem 200 may include base station 205 which may be an example of a base station described above with reference to FIG. 1. In some cases, base station 205 may be configured to communicate with UE 215 using directional antennas that transmit wireless signals in certain directions—such transmission may be referred to as "beamformed transmissions." The transmission direction configured for transmissions from base station 205 to UE 215 may be represented by first transmit beam 240 or second transmit beam 245. In some cases, base station 205 transmits to UE 215, either concurrently or sequentially, using multiple transmit beams having different transmission directions (e.g., first transmit beam 240 and second transmit beam 245). Additionally, or alternatively, base station 205 may transmit dual-polarized transmissions. That is, base station 205 may concurrently transmit a horizontally polarized version of a transmission and a vertically polarized version of a transmission (e.g., via the same beam).

Wireless communications subsystem 200 may include UE 215 which may be an example of a UE described above with reference to FIG. 1. In some cases, UE 215 may be configured with first antenna panel 220 and second antenna panel 225. First antenna panel 220 may include a first antenna set configured to receive horizontally polarized transmissions and a second antenna set configured to receive vertically polarized antennas. In some cases, the first antenna set and the second antenna set may be referred to as antenna panels themselves. The first antenna set in first antenna panel 220 may be associated with a first receive port configured at UE 215 and the second antenna set in first antenna panel 220 may be associated with a second receive port configured at UE 215. In some cases, the first antenna panel 220 may be configured to receive transmissions arriving from a first direction—e.g., by assigning certain weights to the antenna sets included in the first antenna panel. The receiving direction configured at first antenna panel 220 may be represented by first receive beam 230. In some cases, UE 215 may be unable to receive a transmission or multiple transmissions from multiple directions using first antenna panel 220 (e.g., first antenna panel 220 may support a single dual-polarized beam). In some cases, first antenna panel 220 may be used to receive transmissions in a frequency band (e.g., a first frequency band)—e.g., based on the first and second receive ports being configured for the first frequency band.

Second antenna panel 225 may be similarly configured as first antenna panel 220. That is, second antenna panel 225 may include a first antenna set configured to receive horizontally polarized transmissions and a second antenna set configured to receive vertically polarized transmissions. Also, second antenna panel 225 may be associated with a third receive port and a fourth receive port and may similarly be configured to receive transmissions arriving from a certain direction, as represented by second receive beam 235. A direction of receive beam 235 may be the same or different than a direction of first receive beam 230. Second antenna panel 225 may be used to receive transmissions in a different frequency band than first antenna panel 220 (e.g., a second frequency band)—e.g., based on the third and fourth receive ports being configured for the second frequency band. In some cases, configuring a receive port for operation within a frequency band includes downconverting or upconverting using a local oscillator that generates a carrier frequency for transmitting and receiving communications over the frequency band. In some cases, frequency bands are separated in frequency by an amount that prevents the same local oscillator from being used for both frequency bands concurrently. Thus, different frequency bands may be associated with different local oscillators, or retuning of a local oscillator for the different frequency band.

In some cases, receive ports associated with both first antenna panel 220 and second antenna panel 225 may be configurable to receive transmissions in multiple frequency bands—e.g., by applying an output of different local oscillators to signals detected at first antenna panel 220 and second antenna panel 225. The hardware configuration of UE 215 is discussed in more detail herein and with reference to FIG. 3.

Base station 205 and UE 215 may communicate with one another within coverage area 210, as described above with reference to FIG. 1.

As discussed above and herein, a wireless device (e.g., a UE) may be unable to receive one or more transmissions (e.g., a single transmission or simultaneous transmissions) via multiple receive beams when the one or more transmissions are transmitted within a single frequency band.

A wireless device that is configured with multiple antenna panels may be configured to utilize an unused set of receive ports (e.g., not used when the wireless device is configured for operation in a single frequency band) to enable the reception of one or more transmissions over multiple receive beams when the one or more transmissions are transmitted within a single frequency band. By enabling reception of one or more transmissions over multiple receive beams when the one or more transmissions are transmitted within a single frequency band, a wireless device that is configured (e.g., by the network) to operate within the single frequency band may be able to perform dual-beam reception, concurrent reception and beam search, or dual-beam search operations.

For example, UE 215 may be configured with first antenna panel 220, which may be associated with a first and second receive port, and second antenna panel 225, which may be associated with a third and fourth receive port. In some cases, UE 215 may be configured to operate in a first mode in which UE 215 is able to receive via a single receive beam within a single frequency band using a single, active antenna panel. For example, while operating in the first mode, UE 215 may be configured to receive over only one of first antenna panel 220 or second antenna panel 225. In other examples, while operating in the first mode, UE 215 may be configured to use only one of first antenna panel 220 or second antenna panel 225 at a time—e.g., UE 215 may be capable of switching between first antenna panel 220 or second antenna panel 225. In other cases, UE 215 may be configured in a second mode in which UE 215 is able to receive via multiple receive beams over multiple frequency bands using both antenna panels. For example, while operating in the second mode, UE 215 may be configured to receive over first antenna panel 220 via receive beam 230 within a first frequency band and over second antenna panel 225 via receive beam 235 within a second frequency band.

In some cases, base station 205 sends a configuration message to dynamically configure UE 215 to use one of first antenna panel 220 or second antenna panel 225. In other cases, a modem included in UE 215 is statically configured (e.g., pre-programmed before deployment) to support reception over one of first antenna panel 220 or second antenna panel 225. For example, a modem included in UE 215 may be programmed to support reception over first antenna panel 220. In other cases, a modem included in UE 215 may be programmed to support reception over first antenna panel 220 within a first frequency band and over second antenna panel 225 within a second frequency band. In some cases, UE 215 may also be configured (e.g., dynamically by the network (e.g., base station 205) or statically during pre-deployment) to receive communications within a single frequency band.

In some cases, UE 215 may determine that it includes at least two antenna panels (e.g., first antenna panel 220 and second antenna panel 225). UE 215 may also determine that it is configured to use a single antenna panel at a time and/or to receive communications within a single frequency band. After making this determination, UE 215 may determine that an antenna panel is unused and/or associated receive ports are in an idle state. For example, UE 215 may determine that communications are to be received within a first frequency band and that first antenna panel 220 is configured for the first frequency band while second antenna panel 225 is configured for a second frequency band. UE 215 may then determine that a second set of receive ports coupled with second antenna panel 225 are in an idle state (e.g., not currently used for communication).

In some cases, UE 215 may utilize the idle set of receive ports to receive one or more transmissions using multiple receive ports when the one or more transmissions are transmitted within the first frequency band. For example, UE 215 may reconfigure second antenna panel 225 for the first frequency band and may activate the second set of receive ports so that signals detected at second antenna panel 225 may be processed by UE 215—i.e., so that signals detected at the second antenna panel 225 may be received using the second set of receive ports and processed by UE 215. By utilizing an otherwise unused antenna panel and corresponding set of receive ports, UE 215 may be capable of supporting (1) the reception of one transmission over multiple receive beams; (2) the simultaneous reception of multiple transmissions over multiple receive beams—e.g., one transmission may be received using one receive port corresponding to one receive beam and the other transmission may be received using another receive port corresponding to another receive beam; (3) the reception of one transmission over a receive beam simultaneously with the performance of a search for another receive beam; (4) the performance of simultaneous searches for receive beams—e.g., half of the available receive beams may be searched using one receive port corresponding to first antenna panel 220 while the other half of the available receive beams may be searched using another receive port corresponding to second antenna panel 225; (5) the selection of one of the antenna panels to receive a transmission and/or subsequent transmissions; and (6) other dual reception/search operations.

In some cases, UE 215 transmits an indication of its capability to receive over multiple receive beams to base station 205—e.g., by transmitting an indication that the UE 215 supports two or more antenna panels or supports more than one antenna panel within multiple frequency bands. Based on determining that UE 215 supports reception over multiple receive beams (e.g., in the same or different frequency bands), base station 205 may communicate with UE 215 using a variety of beam configurations including multiple transmit beams across one or multiple frequency bands.

For example, base station 205 may transmit data to UE 215 over multiple transmit beams having different directions (e.g., first transmit beam 240 and second transmit beam 245). In some cases, when transmitting over multiple transmit beams, base station 205 may select two transmit beams for transmission to UE 215 based on channel state information reported by UE 215 for the transmit beams. In some cases, UE 215 may report channel state information for transmit beams for each antenna panel configured at UE 215. In some examples, base station 205 may select two transmit beams that are separated by an angular threshold (e.g., where one of the transmissions arrives at UE 215 after reflecting off an object), and UE 215 may receive the first and second transmission over corresponding receive beams. For instance, one set of transmit and receive beams may be directed toward one another while the other set of transmit and receive beams may be directed toward the reflecting object.

In some examples, base station 205 may accelerate a transmit beam selection process by transmitting over multiple transmit beams at a time. For example, base station 205 may concurrently transmit over two transmit beams of multiple available transmit beams until base station 205 transmits over all of the available transmit beams. In some examples, UE 215 may use first antenna panel 220 to receive a first transmission over a first transmit beam (e.g., via a first receive beam) and second antenna panel 225 to simultaneously receive a second transmission over the second transmit beam (e.g., via a second receive beam). UE 215 may then report channel state information for both of the received transmit beams. Performing dual-beam reception operations after UE 215 configures an unused receive port is discussed in more detail herein and with reference to FIGS. 3 through 5.

Figure 3:
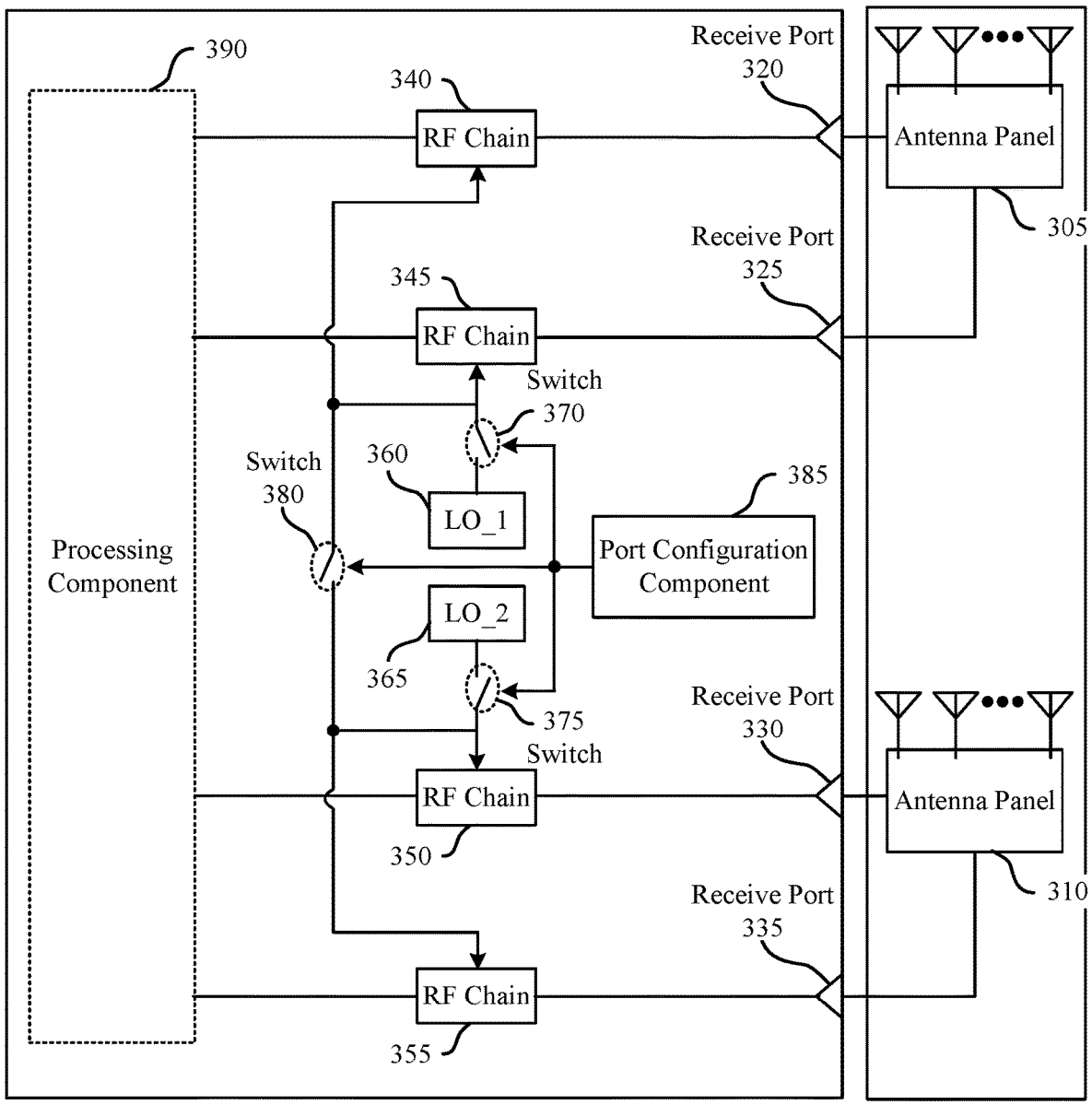
FIG. 3 illustrates aspects of a wireless device that supports beam capability enhancements using multiple receive ports in accordance with various aspects of the present disclosure.

FIG. 3 illustrates aspects of a wireless device that supports beam capability enhancements using multiple receive ports in accordance with various aspects of the present disclosure.

UE 315 may be configured to receive over multiple receive beams within a single frequency band. UE 315 may be an example of a UE as described with reference to FIGS. 1 and 2. UE 315 may include first antenna panel 305, second antenna panel 310, first receive port 320, second receive port 325, third receive port 330, and fourth receive port 335. UE 315 may also include first RF chain 340, second RF chain 345, third RF chain 350, fourth RF chain 355, first local oscillator 360, and second local oscillator 365. UE 315 may also include first switch 370, second switch 375, third switch 380, and port configuration component 385. UE 315 may also include processing component 390.

First antenna panel 305 may be configured to receive wireless transmissions. In some cases, first antenna panel 305 may be configured to receive dual-polarized transmissions—e.g., first antenna panel may be configured to receive a vertically polarized and a horizontally polarized version of a transmission. In some cases, first antenna panel 305 may be configured to receive transmissions from a particular direction (e.g., receive beam). First antenna panel 305 may include multiple antennas (e.g., four antennas for receiving vertically polarized transmissions and four antennas for receiving horizontally polarized transmissions). In some cases, first antenna panel 305 is configured to receive in a particular direction by assigning certain weights to signals received over the different antennas. Thus, UE 315 may be capable of receiving signals using first receive port 320 and second receive port 325 from a single direction.

Second antenna panel 310 may be similarly configured as first antenna panel 305. Second antenna panel 310 may be configured to receive transmissions from a same or different direction than first antenna panel 305. In some cases, first antenna panel 305 and second antenna panel 310 may be capable of receiving over both the first frequency band and the second frequency band.

First receive port 320 may be configured to receive signals detected at a particular configuration of antennas at first antenna panel 305 via first RF chain 340. For example, first receive port 320 may be configured to receive signals detected at antennas in first antenna panel 305 associated with horizontally polarized versions of a transmission. In some cases, first receive port 320 may include first RF chain 340. First receive port 320 may also include an input pin used to pass a signal detected at first antenna panel 305 to first RF chain 340. In some cases, first receive port 320 may include or be connected to an antenna set included in first antenna panel 305.

Second receive port 325 may be configured to receive signals detected at a particular configuration of antennas at first antenna panel 305 via second RF chain 345. For example, second receive port 325 may be configured to receive signals detected at antennas in first antenna panel 305 associated with vertically polarized versions of a transmission. In some cases, second receive port 325 may include second RF chain 345. Second receive port 325 may also include an input pin used to pass a signal detected at first antenna panel 305 to second RF chain 345. In some cases, second receive port 325 may include or be connected to an antenna set included in first antenna panel 305.

Third receive port 330 may be configured to receive signals detected at a particular configuration of antennas at second antenna panel 310 via third RF chain 350. For example, third receive port 330 may be configured to receive signals detected at antennas in second antenna panel 310 associated with horizontally polarized versions of a transmission. In some cases, third receive port 330 may include third RF chain 350. Third receive port 330 may also include an input pin used to pass a signal detected at second antenna panel 310 to third RF chain 350. In some cases, third receive port 330 may include or be connected to an antenna set included in second antenna panel 310.

Fourth receive port 335 may be configured to receive signals detected at a particular configuration of antennas at second antenna panel 310 via fourth RF chain 355. For example, fourth receive port 335 may be configured to receive signals detected at antennas in second antenna panel 310 associated with vertically polarized versions of a transmission. In some cases, fourth receive port 320 may include fourth RF chain 355. Fourth receive port 335 may also include an input pin used to pass a signal detected at second antenna panel 310 to fourth RF chain 355. In some cases, fourth receive port 335 may include or be connected to an antenna set included in second antenna panel 310.

First RF chain 340 may be configured to process a signal received using first receive port 320. First RF chain 340 may include amplifiers, attenuators, and/or filters to extract the information signal from the signal received using first receive port 320. First RF chain 340 chain may also include mixers for downconverting from a carrier signal used to transmit the information (e.g., to an intermediate frequency or a baseband frequency). Mixers within first RF chain 340 may apply carrier and/or intermediate frequencies to the signal received using first receive port 320, causing frequency components of the received signal to shift. For example, a carrier frequency may be applied to the received signal, shifting the received signal to an intermediate frequency range. Next, an intermediate frequency may be applied to the shifted signal to remove remaining carrier frequency components and isolate the information signal (e.g., as a baseband signal). Alternatively, the received signal may be directly converted to a baseband frequency. First RF chain 340 may also include components for measuring components of a processed signal, such as signal-to-noise ratio (SNR) and phase. Second RF chain 345 may similarly be configured to process a signal received using second receive port 325.

In some cases, second RF chain 345 may be omitted from UE 315. In such cases, first RF chain 340 may be shared between first receive port 320 and second receive port 325. Also, first receive port 320 and second receive port 325 may be passed through complementary switches so that a signal from only one of first receive port 320 or second receive port 325 is provided to first RF chain 340. Port configuration component 385 may be configured to provide control signals to the switches coupled with first receive port 320 and second receive port 325 to select one of the receive ports, providing the signal received using the selected receive port to first RF chain 340.

Third RF chain 350 and fourth RF chain 355 may be similarly configured as first RF chain 340 and second RF chain 345. Third RF chain 350 may receive and process signals received using third receive port 330. Fourth RF chain 355 may receive and process signals received using fourth receive port 335. In some cases, third RF chain 350 may be omitted from UE 315, and fourth RF chain 355 may be shared between third receive port 330 and fourth receive port 335 as described above with reference to the first RF chain 340.

First local oscillator 360 may be configured to generate and provide a signal to first RF chain 340 and second RF chain 345 that has a frequency that can be used to remove the carrier frequency component of a signal received using first receive port 320 and/or second receive port 325. In some cases, the frequency of the signal generated by first local oscillator 360 is equivalent to a center frequency of a frequency band associated with signals received via first antenna panel 305—e.g., if first antenna panel is configured for reception in the 28 GHz band, first local oscillator 360 may generate a signal that has a frequency of 28.5 GHz. In other cases, the frequency of the signal generated by first local oscillator 360 is associated with a frequency that shifts the frequency of a signal received using a receive port to an intermediate frequency. First RF chain 340 and second RF chain 345 may use the signal generated by first local oscillator 360 to create multiple signals having varying frequencies.

Second local oscillator 365 may be similarly configured to generate and provide a signal to third RF chain 350 and fourth RF chain 355 that has a frequency that can be used to remove the carrier frequency component of a signal received using third receive port 330 or fourth receive port 335. In some cases, the frequency of the signal generated by second local oscillator 365 is equivalent to a center frequency of a frequency band associated with signals received via second antenna panel 310 (e.g., 39.5 GHz for the 39 GHz band).

First switch 370 may be configured to couple a signal generated by first local oscillator 360 to first RF chain 340 and second RF chain 345 or to prevent the signal generated by first local oscillator 360 from reaching first RF chain 340 and second RF chain 345. In some cases, first switch 370 may be left open, preventing the flow of signals between first local oscillator 360, first RF chain 340, and second RF chain 345, if UE 315 is configured so that first receive port 320 and second receive port 325 are in an inactive state—e.g., if UE 315 is configured to use only second antenna panel 310 or if UE 315 is configured to operate within a single frequency band.

Second switch 375 may be configured to couple a signal generated by second local oscillator 365 to third RF chain 350 and fourth RF chain 355 or to prevent the signal generated by second local oscillator 365 from reaching third RF chain 350 and fourth RF chain 355. In some cases, second switch 375 may be left open, preventing the flow of signals between second local oscillator 365, third RF chain 350, and fourth RF chain 355, if UE 315 is configured so that third receive port 330 and fourth receive port 335 are in an inactive state—e.g., if UE 315 is configured to use only first antenna panel 305 or if UE 315 is configured to operate in a single frequency band.

Third switch 380 may be configured to couple an output of first local oscillator 360 to third RF chain 350 and fourth RF chain 355 and to couple an output of second local oscillator 365 to first RF chain 340 and second RF chain 345. Third switch 380 may be operated in combination with first switch 370 and second switch 375. For example, when providing the output of first local oscillator 360 to third RF chain 350 and fourth RF chain 355, first switch 370 and third switch 380 may be activated (e.g., closed) while second switch 375 may be deactivated (e.g., opened). And when providing the output of second local oscillator 365 to first RF chain 340 and second RF chain 345, second switch 375 and third switch 380 may be activated (e.g., closed) while first switch 370 may be deactivated (e.g., opened).

Other switching configurations may be used to enable signals received using third receive port 330 and fourth receive port 335 to be processed using a local oscillator that is configured for the first frequency band, and vice versa. In one example, first switch 370, second switch 375, and third switch 380 may be excluded, and signals received using third receive port 330 may be processed using first local oscillator 360 by including a switchable connection between the output of second antenna panel 310 and first RF chain 340. Similarly, signals received using fourth receive port 335 may be processed using first local oscillator 360 by including a switchable connection between the output of second antenna panel 310 and the output of second RF chain 345.

Port configuration component 385 may be configured to control (e.g., activate and deactivate) first switch 370, second switch 375, and third switch 380. In some cases, port configuration component 385 operates first switch 370, second switch 375, and third switch 380 based on determining that UE 315 is configured to use only one of first antenna panel 305 or second antenna panel 310. In some cases, port configuration component 385 operates first switch 370, second switch 375, and third switch 380 based on determining that UE 315 is configured to operate in a single frequency band.

Processing component 390 may be configured to further process a signal received using first receive port 320, second receive port 325, third receive port 330, and/or fourth receive port 335 after the received signals are processed by first RF chain 340, second RF chain 345, third RF chain 350, and/or fourth RF chain 355. Processing component 390 may include components for sampling, demodulating, and decoding information signals output by first RF chain 340, second RF chain 345, third RF chain 350, and/or fourth RF chain 355. Processing component 390 may also include components for generating channel state information for received signals—e.g., based on measurements taken of the signal by a corresponding RF chain or by processing component 390. In some cases, all or a portion of the components included in processing component 390 may be included within first RF chain 340, second RF chain 345, third RF chain 350, and/or fourth RF chain 355, and vice versa.

In some examples, UE 315 is configured (e.g., during pre-deployment programming or by the network) to use only one of first antenna panel 305 and second antenna panel 310. For example, a modem included in UE 315 may be programmed in a first mode to support communications over one antenna panel within a single frequency band, even when UE 315 includes multiple antenna panels. For example, the network may configure UE 315 to communicate via one or multiple carriers within a single frequency band. In some cases, the modem may be programmed to support communications over one antenna panel configured for a first frequency band (e.g., first antenna panel 305). In another example, a modem included in UE 315 may be programmed in a second mode to support communications over multiple antenna panels within multiple frequency bands, but the network may configure UE 315 to communicate within a single frequency band. In some examples, the network may configure UE 315 to activate one of the first or second mode at the embedded modem (e.g., via a configuration of frequency bands and component carriers).

When UE 315 is configured to operate within a single frequency band, one of first antenna panel 305 and second antenna panel 310 may be unused according to the configuration and the corresponding receive port may be placed into an idle state. For example, if UE 315 is configured to operate in the 28 GHz band, first antenna panel 305, first receive port 320, and second receive port 325 may be in an activated state while second antenna panel 310, third receive port 330, and fourth receive port 335 may be unused/in an idle or deactivated state, according to the configuration. In some cases, the RF chains corresponding to the idle antenna panel may also be placed in an idle or deactivated state—e.g., to save power.

UE 315 may determine that one of first antenna panel 305 and second antenna panel 310 would otherwise be in an idle state (e.g., according to a configuration of frequency bands and component carriers) and may reconfigure the receive ports coupled with the idle antenna panel (or "idle receive ports") for communications within the same frequency band as the receive ports coupled with the activated antenna panel (or "active receive ports"). For example, if second antenna panel 310 would otherwise be in an idle state, UE 315 may reconfigure third receive port 330 and fourth receive port 335 to operate in the same frequency band as first receive port 320 and second receive port 325. To reconfigure idle receive ports for the same frequency band as the active antenna panel, UE 315 may provide the signal generated by the local oscillator associated with the active antenna panel to the RF chain corresponding to the idle antenna panel. For example, if second antenna panel 310 is in an idle state, UE 315 may provide the signal generated by first local oscillator 360 to third RF chain 350 and fourth RF chain 355—e.g., by activating first switch 370 and third switch 380 and deactivating second switch 375. By reconfiguring the idle receive ports coupled with the idle antenna panel for the same frequency band as the active receive ports, UE 315 may concurrently process signals received via first antenna panel 305 and second antenna panel 310 that are detected within the same frequency band.

In some cases, after configuring the otherwise idle receive port(s) for the same frequency band as the active receive port(s), UE 315 may configure first antenna panel 305 to receive transmissions incoming from a first direction (i.e., via a first receive beam) and second antenna panel 310 to receive transmission incoming from the same or a different direction (i.e., via a second receive beam).

In some examples, a base station transmits a single transmission to UE 315 after UE 315 configures receive ports coupled with first antenna panel 305 and/or second antenna panel 310 to receive transmissions within a single frequency band. The transmission of a single transmissions is discussed in more detail herein and with reference to FIG. 5. In some cases, the single transmission may be transmitted over a single component carrier. In some cases, the single transmission may be transmitted using a single transmit beam. In some cases, the single transmission may be a dual-polarized transmission. In some cases, the single transmission may be a non-polarized transmission. In other cases, the single transmission may be a polarized transmission. In some cases, the base station transmits using any combination of the above techniques.

Based on reconfiguring the receive ports coupled with first antenna panel 305 and/or second antenna panel 310 for the same frequency band, UE 315 may process first signal(s) corresponding to the transmission that are detected at first antenna panel 305 via a first receive beam and second signal(s) corresponding to the transmission that are detected at second antenna panel 310 via a second receive beam. In some cases, the first signal(s) may be received using first receive port 320 and/or second receive port 325 and the second signal(s) may be received using third receive port 330 and/or fourth receive port 335. When the transmission is a non-polarized transmission, a first signal corresponding to the transmission may be received using either first receive port 320 or second receive port 325, and a second signal may be received using either first receive port 320 or second receive port 325. When the transmission is a dual-polarized transmission, a first signal corresponding to a horizontally polarized version of the transmission may be received using first receive port 320, and a second signal corresponding to a vertically polarized version of the transmission may be received using second receive port 325. Similarly, a third signal corresponding to a horizontally polarized version of the transmission may be received using third receive port 330 and a fourth signal corresponding to a vertically polarized version of the transmission may be received using fourth receive port 335.

In some cases, first RF chain 340 and second RF chain 345 may process signals received using first receive port 320 and second receive port 325. Processing the signals may include downconverting, filtering, attenuating, amplifying, demodulating, decoding, and/or measuring the signals. Processing the signals may also include taking measurements of the signals (e.g., SNR and phase measurements). First RF chain 340 and second RF chain 345 may pass the processed signals to processing component 390. In some cases, processing component 390 demodulates, decodes, and/or takes measurements of the processed signals—e.g., instead performing one or all of these operations in first RF chain 340 and second RF chain 345. In some cases, processing component 390 combines the processed signals or selects certain signals for additional processing after selecting one of first antenna panel 305 or second antenna panel 310. Similarly, third RF chain 350 and/or fourth RF chain 355 may process signals received using third receive port 330 and fourth receive port 335 and may pass the processed signals to processing component 390, where these signals may similarly be processed.

In some cases, processing component 390 may decode the processed signal(s) received from first RF chain 340 and second RF chain 345 to obtain a first stream of data. Processing component 390 may also determine channel state information for the processed signal(s) received from third RF chain 350 and fourth RF chain 355 to determine beam information for the receive beam used by second antenna panel 310. By measuring information for the receive beam used by second antenna panel 310 while data is received via first antenna panel 305, throughput may be increased—e.g., because UE 315 may perform a receive beam refinement procedure at the same time that data is received instead of suspending data reception to perform a receive beam search. In some cases, UE 315 may select the receive beam used by second antenna panel 310 for receiving subsequent transmissions—e.g., by configuring either first antenna panel 305 to receive over the selected receive beam or receiving subsequent transmissions over the second antenna panel 310 already configured to receive over the selected receive beam.

In some cases, processing component 390 may combine the processed signal(s) received from first RF chain 340 and second RF chain 345 and the processed signal(s) received from third RF chain 350 and fourth RF chain 355. By combining the processed signals, the likelihood of successfully receiving the transmission from the base station may be increased. When the single transmission received from the base station is a dual-polarized transmission, first receive port 320 and second receive port 325 may receive first signals corresponding to horizontally and vertically dual-polarized versions of the transmission via first antenna panel 305. And third receive port 330 and fourth receive port 335 may receive second signals corresponding to horizontally and vertically dual-polarized versions of the transmission via first antenna panel 305 via second antenna panel 310. In some cases, the signals received via first antenna panel 305 may be combined with the signals received via second antenna panel 310. For example, processing component 390 may combine a signal corresponding to a horizontally polarized version of the transmission that is received using first receive port 320 and a signal corresponding to a vertically polarized version of the transmission that is received using fourth receive port 335. Similarly, processing component 390 may combine a signal corresponding to the vertically polarized version of the transmission that is received using second receive port 320 and the signal corresponding to the horizontally polarized version of the transmission received using third receive port 330.

In some cases, processing component 390 may determine channel state information for the processed signal(s) received from first RF chain 340 and second RF chain 345 and the processed signal(s) received from third RF chain 350 and fourth RF chain 355. In such cases, processing component 390 may determine a preferred receive beam based on the processed signals and use the preferred receive beam to receive subsequent transmissions from the base station. A preferred receive beam may be associated with SNR levels that exceed a threshold value or that are greater than SNR levels associated with a receive beam used to receive transmissions by a threshold amount. In some cases, UE 315 may configure both first antenna panel 305 and second antenna panel 310 to use the selected receive beam to receive subsequent transmissions. By measuring information for a first receive beam used by first antenna panel 305 and a second receive beam used by second antenna panel, a receive beam search procedure may be accelerated—e.g., because two beams, instead of one, may be searched at one time.

In some cases, processing component 390 may choose whether to decode the processed signal(s) received from first RF chain 340 and second RF chain 345 via first antenna panel 305 or the processed signal(s) received from third RF chain 350 and fourth RF chain 355 via second antenna panel to obtain a stream of data. For example, processing component 390 may select the processed signal(s) received from third RF chain 350 and fourth RF chain 355 after determining that the SNR associated with the processed signal(s) received from third RF chain 350 and fourth RF chain 355 is above a threshold and the SNR associated with the processed signal(s) received from first RF chain 340 and second RF chain 345 are below a threshold—e.g., which may occur if a user's hand is blocking first antenna panel 305. Additionally, or alternatively, processing component 390 may select the processed signal(s) received from third RF chain 350 and fourth RF chain 355 after determining that the SNR of the signal received from first RF chain 340 and second RF chain 345 is lower than the SNR associated with signal received from third RF chain 350 and fourth RF chain 355 by a predetermined amount. In some cases, UE 315 may use second antenna panel 310 to receive subsequent communications based on selecting the processed signal(s) received from third RF chain 350 and fourth RF chain 355.

In some examples, a base station transmits concurrent transmissions to UE 315 after UE 315 configures receive ports coupled with first antenna panel 305 and/or second antenna panel 310 to receive transmissions within a single frequency band. The transmission of concurrent transmissions is discussed in more detail herein and with reference to FIG. 6. In some cases, the concurrent transmissions may be transmitted over multiple transmit beams and/or from multiple transmission reception points. In some cases, the concurrent transmissions may be transmitted using multiple component carriers. In some cases, the concurrent transmissions may be non-polarized transmissions. In other cases, the concurrent transmissions may be polarized transmissions. In some cases, the concurrent transmissions may carry different data. In other cases, the concurrent transmissions may carry the same data. In some cases, the base station transmits using any combination of the above techniques—e.g., base station may transmit a first polarized transmission over a first component carrier from a first transmission point and a second polarize transmission over a second component carrier from a second transmission point.

In some cases, when the multiple transmissions are transmitted over multiple component carriers, UE 315 may configure first antenna panel 305 to receive a transmission over a first component carrier via a first receive beam and second antenna panel 310 to receive a second transmission over a second component carrier via a second receive beam.

By using first antenna panel 305 and second antenna panel 310 to receive different transmissions over different component carriers via different receive beams instead of receiving the different transmissions over the same receive beams, UE 315 may increase the likelihood of successfully receiving both transmissions—e.g., because signals transmitted over the second component carrier may be received via the second receive beam with better signal quality than if the signals were transmitted over the second component carrier via the first receive beam, and vice versa. For similar reasons, when multiple transmissions are transmitted over multiple transmit beams and/or from multiple transmission points, UE 315 may configure first antenna panel 305 to receive a transmission from a first transmit beam and/or transmission point via a first receive beam and second antenna panel 310 to receive a second transmission from a second transmit beam and/or transmission point via a second receive beam.

Based on reconfiguring the receive ports coupled with first antenna panel 305 and/or second antenna panel 310, UE 315 may process first signal(s) corresponding to the first transmission that is detected at first antenna panel 305 via a first receive beam and second signal(s) corresponding to the second transmission that is detected at second antenna panel 310 via a second receive beam. In some cases, the first signal(s) may be received using first receive port 320 and/or second receive port 325 and the second signal(s) may be received using third receive port 330 and/or fourth receive port 335. In some cases, the first and second transmissions may be non-polarized transmissions. In such cases, a first signal corresponding to the first transmission may be received using either first receive port 320 or second receive port 325, and a second signal corresponding to the second transmission may be received using either first receive port 320 or second receive port 325. In other cases, the first and second transmissions may be polarized transmissions. In such cases, a first signal corresponding to a horizontally polarized version of the first transmission may be received using first receive port 320 and a second signal corresponding to a vertically polarized version of the first transmission may be received using second receive port 325. Similarly, a third signal corresponding to a horizontally polarized version of the second transmission may be received using third receive port 330 and a fourth signal corresponding to a vertically polarized version of the second transmission may be received using fourth receive port 335.

In some cases, the first transmission may be transmitted over a first transmit beam and a second transmit beam may be transmitted over a second component carrier. In such cases, a first signal corresponding to the first transmit beam and first component carrier may be received using either first receive port 320 or second receive port 325 and a second signal corresponding to the second transmit beam and second component carrier may be received using either third receive port 330 or fourth receive port 335. In some cases, the first transmission may be transmitted from a first transmission point and the second transmission may be transmitted from a second transmission point. In such cases, a first signal corresponding to the first transmission and first transmission point may be received using either first receive port 320 or second receive port 325 and a second signal corresponding to the second transmission and second transmission point may be received using either third receive port 330 or fourth receive port 335.

In some cases, the first transmission may be transmitted over a first component carrier and the second transmission may be transmitted over a second component carrier. In such cases, a first signal corresponding to the first transmission and first component carrier may be received using either first receive port 320 or second receive port 325 and a second signal corresponding to the second transmission and second component carrier may be received using either third receive port 330 or fourth receive port 335.

In some cases, first RF chain 340 and/or second RF chain 345 may process signals received using first receive port 320 and/or second receive port 325 and may pass the processed signal(s) to processing component 390. Processing the signals may include downconverting, filtering, attenuating, amplifying, demodulating, and/or decoding the signals. Processing the signals may also include taking measurements of the signals (e.g., SNR and phase measurements). First RF chain 340 and second RF chain 345 may pass the processed signals to processing component 390. In some cases, processing component 390 demodulates, decodes, and/or takes measurements of the processed signals. In some cases, processing component 390 combines the signals or performs antenna selection. Third RF chain 350 and/or fourth RF chain 355 may process signal(s) received using third receive port 330 and fourth receive port 335 and may pass the processed signal(s) to processing component 390, where these signals may similarly be processed.

In some cases—e.g., when different data is transmitted in the multiple transmissions—processing component 390 may decode the processed signal(s) received from first RF chain 340 and second RF chain 345 to obtain a first stream of data and the processed signal(s) received from third RF chain 350 and fourth RF chain 355 to obtain a second stream of data. By decoding the first and second processed signal(s) to obtain multiple streams of data, throughput of the communication link may be increased.

In some cases—e.g., when the same data is transmitted in the multiple transmissions—processing component 390 may combine the processed signal(s) received from first RF chain 340 and second RF chain 345 to obtain a first stream of data and the processed signal(s) received from third RF chain 350 and fourth RF chain 355 to obtain a single stream of data. By combining the processed signals, the likelihood of successfully receiving the transmission from the base station may be increased. When the multiple transmissions received from the base station are dual-polarized transmissions that carry the same data, first receive port 320 and second receive port 325 may receive first signals corresponding to horizontally and vertically dual-polarized versions of the first transmission via first antenna panel 305. And third receive port 330 and fourth receive port 335 may receive second signals corresponding to horizontally and vertically dual-polarized versions of the second transmission via first antenna panel 305 via second antenna panel 310. In some cases, the first signals received via first antenna panel 305 may be combined with the first signals received via second antenna panel 310. For example, processing component 390 may combine a signal corresponding to a horizontally polarized version of the transmission that is received using first receive port 320 and a signal corresponding to a vertically polarized version of the transmission that is received using fourth receive port 335. Similarly, processing component 390 may combine a signal corresponding to the vertically polarized version of the transmission that is received using second receive port 320 and the signal corresponding to the horizontally polarized version of the transmission received using third receive port 330.

In some cases—e.g., when the same data is transmitted in the multiple transmissions—processing component 390 may choose whether to decode the processed signal(s) received from first RF chain 340 and second RF chain 345 via first antenna panel 305 or the processed signal(s) received from third RF chain 350 and fourth RF chain 355 via second antenna panel to obtain a stream of data. In some cases, processing component 390 chooses which processed signal (s0 to decode based on channel measurements taken for the processed signal(s).

In some cases—e.g., when the transmissions are transmitted over multiple transmit beams—processing component 390 may determine channel state information for the processed signal(s) received from first RF chain 340 and second RF chain 345 via the first transmit beam and the processed signal(s) received from third RF chain 350 and fourth RF chain 355 via the second transmit beam. Processing component 390 may also concurrently generate beam feedback information for the first and second transmit beam, and in some cases, may report beam feedback information at an increased interval. By transmitting beam feedback information for multiple transmit beams, beam refinement performed by a base station for one or more transmit beams may be accelerated.

In some cases—e.g., when the transmissions are transmitted over the same or multiple transmit beams—processing component 390 may determine channel state information for the processed signal(s) received from first RF chain 340 and second RF chain 345 and the processed signal(s) received from third RF chain 350 and fourth RF chain 355. In such cases, processing component 390 may determine a preferred receive beam between the first receive beam configured for first antenna panel 305 and the second receive beam configured for second antenna panel 310 based on the processed signals. In some cases, UE 315 may use the preferred receive beam to receive subsequent transmissions from the base station. In some cases, UE 315 may configure both first antenna panel 305 and second antenna panel 310 to use the selected receive beam to receive the subsequent transmissions.

Figure 4:
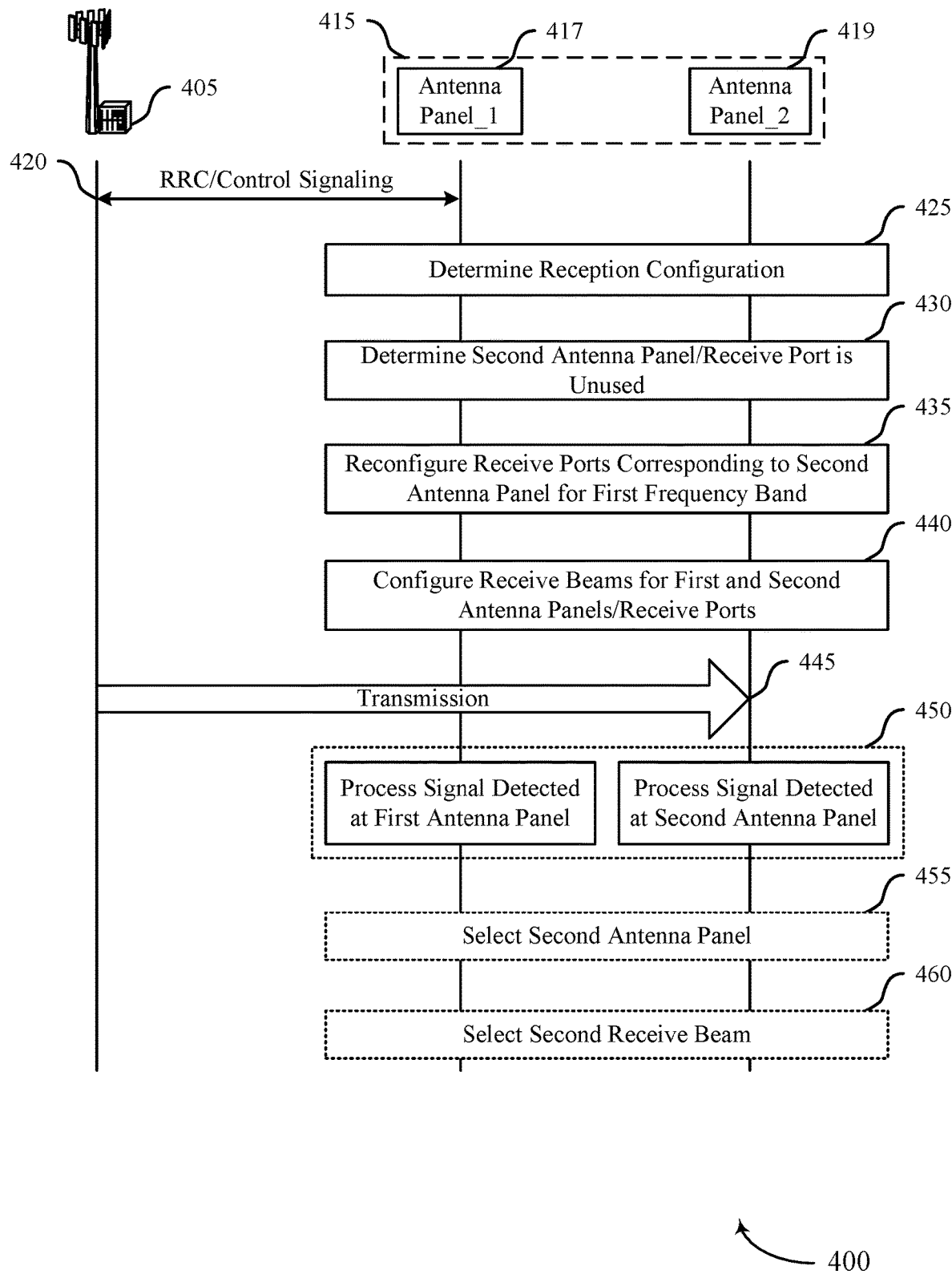
FIG. 4 illustrates aspects of a process for beam capability enhancements using multiple receive ports in accordance with various aspects of the present disclosure.

FIG. 4 illustrates aspects of a process for beam capability enhancements using multiple receive ports in accordance with various aspects of the present disclosure.

Process flow 400 may be performed by base station 405 and UE 415, which may be examples of a base station or UE described above with reference to FIGS. 1 through 3.

In some examples, process flow 400 illustrates the transmission of a single transmission by base station 405 and the reception of the single transmission by UE 415 using first antenna panel 417 and second antenna panel 419. In some cases, UE 415 is configured to receive over one, but not both, of first antenna panel 417 and second antenna panel 419. For example, one antenna panel and the corresponding receive ports at UE 415 may be in an active state while the other antenna panel and the corresponding receive ports at UE 415 may be in a deactivated or idle state. In another example, a modem UE 415 may be configured to support receiving over first antenna panel 417 in a first frequency band and over second antenna panel 419 in a second frequency band, but base station 405 may configure UE 415 to receive over one or more component carriers within a single frequency band—that is, one of the antenna panels may be extraneous to the reception configuration of the UE 415.

In some cases, first antenna panel 417 may be associated with a first set of receive ports and second antenna panel 419 may be associated with a second set of receive ports. In some examples, UE 415 may be capable of receiving over one receive beam at a time within a single frequency band—e.g., because of constraints associated with receive ports corresponding to first antenna panel 417 and second antenna panel 419. In some cases, first antenna panel 417 and second antenna panel 419 may be configured to receive dual-polarized transmissions. In some examples, first antenna panel 417 may be configured to receive over a first frequency band and second antenna panel 419 may be configured to receive over a second frequency band—e.g., when a modem at UE 415 is configured to support receptions over multiple frequency bands.

At arrow 420, base station 405 and UE 415 may exchange radio resource control (RRC) and/or control signaling. In some cases, RRC and/or control signaling transmitted from base station 405 may be received by UE 415 using antenna panel(s) at UE 415 that are in an activated state (e.g., first antenna panel 417). In some cases, UE 415 may indicate to base station 405 that UE 415 is configured with multiple antenna panels and/or multiple receive ports (e.g., at least three (3) receive ports) that correspond to the multiple antenna panels. In some cases, UE 415 may indicate (e.g., in an RRC message) to base station 405 that a modem at UE 415 is configured in a first mode that enables UE 415 to receive over one of first antenna panel 417 and second antenna panel 419 at a time. In other cases, UE 415 may indicate to base station 405 that a modem at UE 415 is configured in a second mode that enables UE 415 to concurrently receive over both of first antenna panel 417 in a first frequency band and second antenna panel 419 in a second frequency band.

In some cases, base station 405 may indicate to UE 415 that communications to UE 415 will be scheduled over a single frequency band. In some cases, base station 405 may indicate to UE 415 that a beam sweeping procedure will be modified based on receiving an indication that UE 415 is configured with multiple antenna panels and/or receive ports—e.g., base station 405 may indicate that concurrent transmissions will be transmitted over multiple transmit beams (e.g., for a beam refinement process). In some cases, base station 405 may indicate to UE 415 that multiple transmissions will be concurrently transmitted over multiple transmit beams—e.g., spatially diverse transmit beams—based on receiving an indication that UE 415 is configured with multiple antenna panels and/or receive ports. In some cases, base station 405 may indicate to UE 415 that multiple transmissions will be transmitted to UE over multiple component carriers, where a first transmission over a first component carrier may be transmitted using a first transmit beam and a second transmission over a second component carrier may be transmitted using a second transmit beam based on receiving an indication that UE 415 is configured with multiple antenna panels and/or receive ports.

At block 425, UE 415 may determine a reception configuration based on the received RRC and control signaling. In some examples, UE 415 may determine that communications will be scheduled for UE 415 over a single frequency band. For example, UE 415 may determine that communications will be scheduled over a single frequency band if the base station indicates that UE 415 is configured with one or more component carrier within a single frequency band. In another example, UE 415 may determine that communications will be scheduled over a single frequency band if a modem at UE 415 is configured (e.g., preconfigured on deployment or initial network access) to utilize only one of first antenna panel 417 and second antenna panel 419 for communications. Thus, UE 415 may determine that one of the antenna panels will be unused and may place the unused antenna panels and corresponding receive ports in an idle state. In some cases, placing the unused antenna panels and receive ports in an idle state includes deactivating all or a portion of components configured to process signals received over second antenna panel 419 and/or deactivating active elements included in second antenna panel 419.

At block 430, UE 415 may determine that second antenna panel 419 is unused—e.g., based on placing second antenna panel 419 in an idle state. UE 415 may also determine that a second set of receive ports corresponding to second antenna panel 419 is in an idle state. In some cases, UE 415 may determine that second antenna panel 419 is in an inactive state based on determining that communications will be scheduled for UE 415 over a first frequency band associated with first antenna panel 417. In some cases, UE 415 may determine that second antenna panel 419 and a corresponding receive port is in an inactive state based on determining that a modem included in UE 415 is configured to support reception over only one of first antenna panel 417 and second antenna panel 419 and that communications will be scheduled for UE 415 over a first frequency band. In some cases, UE 415 may determine that second antenna panel 419 and a corresponding receive port is in an inactive state based on determining that a modem included in UE 415 is currently configured to support reception over first antenna panel 417 but not second antenna panel 419.

At block 435, UE 415 may reconfigure a set of receive ports coupled with second antenna panel 419 to receive communications over the first frequency band—i.e., the first frequency band for which a set of receive ports coupled with first antenna panel 417 is configured. In some cases, reconfiguring the set of receive ports corresponding to second antenna panel 419 for the first frequency band may include disconnecting a second local oscillator configured for the second frequency band from RF chains associated with second antenna panel 419 and connecting a first local oscillator configured for the first frequency band to the RF chains. In some cases, reconfiguring the set of receive ports coupled with second antenna panel 419 may include retuning the second local oscillator for the first frequency band. In some cases, UE 415 may also transition second antenna panel 419 and the corresponding receive ports from an idle to an activated state.

At block 440, UE 415 may configure receive beams for first antenna panel 417 and second antenna panel 419. In some cases, UE 415 may configure first antenna panel 417 to receive transmissions incoming from a first direction—e.g., by adjusting weights assigned to each of the antennas in first antenna panel 417. UE 415 may also configure second antenna panel 419 to receive transmissions incoming from the same or a different direction—e.g., by adjusting weights assigned to each of the antennas in first antenna panel 417. In some cases, UE 415 may configure first antenna panel 417 to form a first receive beam for reception of a first component carrier and second antenna panel 419 to form a second receive beam for reception of a second component carrier. In some cases, UE 415 may configure first antenna panel 417 to form a first receive beam that corresponds to a first transmit beam and second antenna panel 419 to form a second receive beam that corresponds to a second transmit beam.

At arrow 445, base station 405 may transmit a transmission (e.g., a beamformed transmission) within a single frequency band. And UE 415 may receive the transmission via first antenna panel 417 and second antenna panel 419. For example, UE 415 may detect a first signal corresponding to the transmission at first antenna panel 417 via a first receive beam and a second signal corresponding to the transmission at second antenna panel 419 via a second receive beam.

At block 450, the signals detected at first antenna panel 417 and second antenna panel 419 may be processed. Processing the signal detected at first antenna panel 417 may include processing the detected signal with an RF chain of a corresponding receive port. For example, the first signal may be received using a first receive port (e.g., first receive port 320) and/or a second receive port (e.g., second receive port 325). Processing the signal detected at second antenna panel 419 may include processing the detected signal to with an RF chain of a corresponding receive port. For example, the second signal may be received using a third receive port (e.g., third receive port 330) and/or a fourth receive port (e.g., fourth receive port 335).

In some cases, processing the signals detected at first antenna panel 417 and second antenna panel 419 includes measuring characteristics of, demodulating, and/or decoding the signals. In some examples, processing components located within UE 415 measure SNR and phase information for the detected signals. In some cases, processing the signals detected at first antenna panel 417 and second antenna panel 419 includes downconverting the signal using the first local oscillator configured for the first frequency band. In some cases, UE 415 demodulates and/or decodes a signal detected over first antenna panel 417 while measuring signal characteristics of a signal detected over second antenna panel 419, and vice versa. In some cases, UE 415 measures signal characteristics of both of the signals detected over first antenna panel 417 and second antenna panel 419—e.g., when UE 415 performs a dual receive beam search. In some cases, UE 415 combines both of the signals detected over first antenna panel 417 and second antenna panel 419—e.g., when UE 415 uses diversity reception.

At block 455, if UE 415 determines that a signal detected at second antenna panel 419 has superior channel qualities relative to the signal detected at first antenna panel 417, UE 415 may select second antenna panel 419 for receiving the transmission and/or subsequent transmissions—e.g., when UE 415 performs antenna selection.

At block 460 (additionally or alternatively to block 455), if UE 415 determines that a signal received over second antenna panel 419 has superior channel qualities relative to the signal received over first antenna panel 417, UE 415 may select the second receive beam associated with second antenna panel 419 for receiving subsequent transmissions—e.g., when UE 415 performs receive beam selection. In some cases, UE 415 may reconfigure first antenna panel 417 to receive via the second receive beam for subsequent transmissions. In other cases, UE 415 may receive the subsequent transmissions over second antenna panel 419—e.g., because second antenna panel 419 is already configured to receive via the second receive beam.

Figure 5:
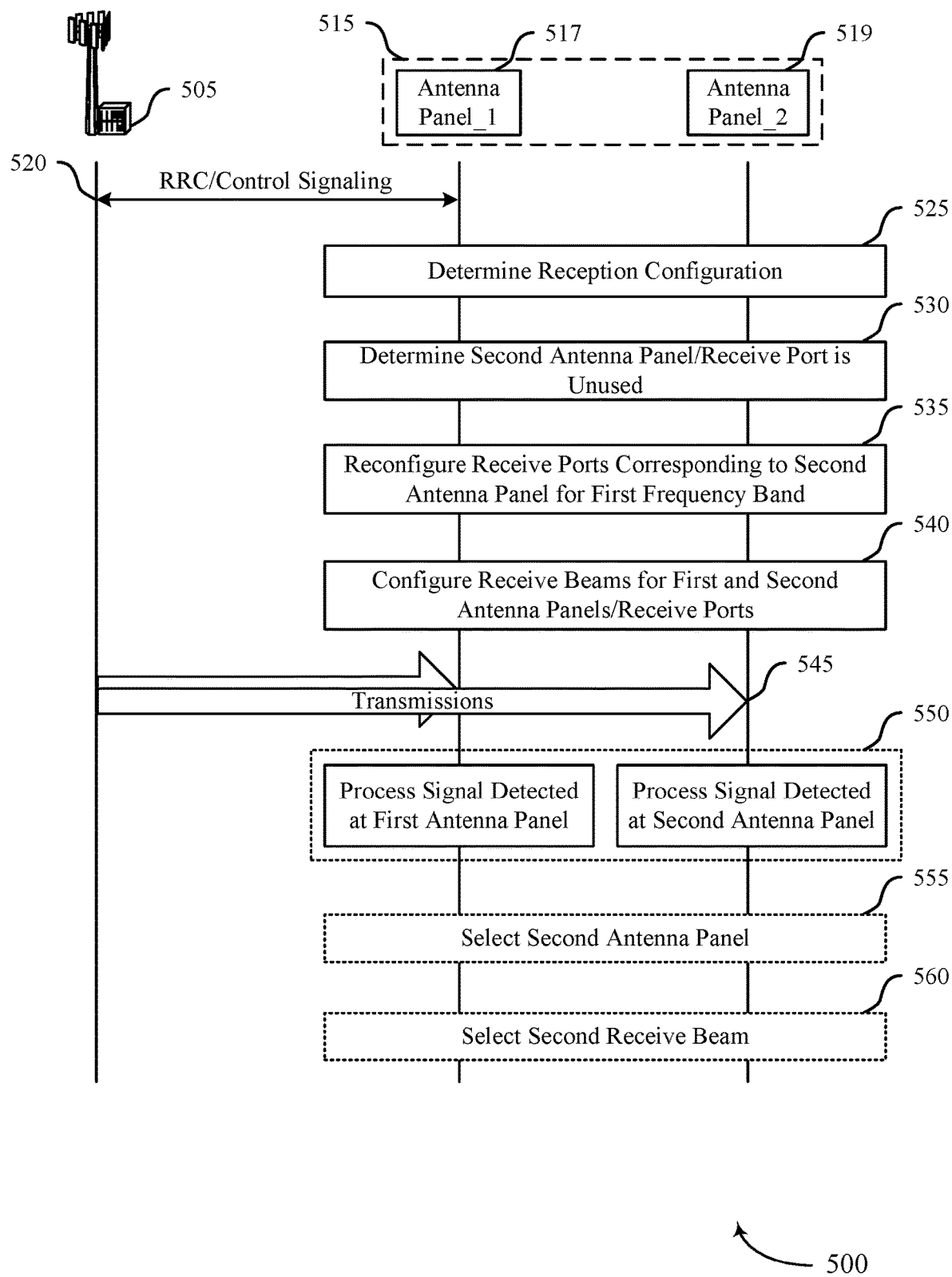
FIG. 5 illustrates aspects of a process for beam capability enhancements using multiple receive ports in accordance with various aspects of the present disclosure.

FIG. 5 illustrates aspects of a process for beam capability enhancements using multiple receive ports in accordance with various aspects of the present disclosure.

Process flow 500 may be performed by base station 505 and UE 515, which may be examples of a base station or UE described above with reference to FIGS. 1 through 3.

In some examples, process flow 500 illustrates the transmission of multiple transmissions by base station 505 and the reception of the multiple transmissions by UE 515 using first antenna panel 517 and second antenna panel 519. In some cases, first antenna panel 517 and second antenna panel 519 are configured as discussed with reference to UE 415 of FIG. 4. For example, UE 515 may be configured to receive over one, but not both, of first antenna panel 517 and second antenna panel 519 at a same time and/or may be configured to receive communications within a single frequency band.

At arrow 520, base station 505 and UE 515 may receive RRC and/or control signaling as similarly discussed with reference to arrow 420 of FIG. 4. At block 525, UE 515 may determine a reception configuration as similarly discussed with reference to block 425 of FIG. 4. At block 530, UE 515 may determine that second antenna panel 519 and/or corresponding receive port(s) are unused as similarly discussed with reference to block 430 of FIG. 4. At block 535, UE 515 may reconfigure receive ports corresponding to second antenna panel 519 for the first frequency band as similarly discussed with reference to block 435 of FIG. 4. At block 540, UE 515 may configure first antenna panel 517 to form a first receive beam and second antenna panel 519 to form a second receive beam as similarly discussed with reference to block 440 of FIG. 4.

At arrow 545, base station 505 may transmit and UE may receive multiple transmissions (e.g., multiple beamformed transmissions) from base station 505. In some cases, the multiple transmissions may include a first transmission over a first component carrier and a second transmission over a second component carrier. In some cases, the multiple transmission may include a first transmission from a first transmission point and a second transmission from a second transmission point, where the first and second transmission points may be physically separated or non-quasi colocated relative to one another (e.g., first and second transmission point may be different radio heads or base stations). In some cases, the multiple transmission may include a first transmission that is transmitted via a first transmit beam and a second transmission that is transmitted via a second transmit beam. The multiple transmissions may carry the same or different data.

At block 550, the signals detected at first antenna panel 417 and second antenna panel 419 may be processed. Processing the signal detected at first antenna panel 417 may include processing the detected signal with an RF chain of a corresponding receive port. For example, the first signal may be received using a first receive port (e.g., first receive port 320) and/or a second receive port (e.g., second receive port 325). Processing the signal detected at second antenna panel 419 may include processing the detected signal to with an RF chain of a corresponding receive port. For example, the second signal may be received using a third receive port (e.g., third receive port 330) and/or a fourth receive port (e.g., fourth receive port 335).

In some cases, processing the signals detected at first antenna panel 517 and second antenna panel 519 includes measuring characteristics of, demodulating, and/or decoding the signals. In some examples, processing components located within UE 515 measure SNR and phase information for the detected signals. In some cases, processing the signals detected at first antenna panel 517 and second antenna panel 519 includes downconverting the signal using the first local oscillator configured for the first frequency band. In some cases, UE 515 demodulates and decodes a signal detected over first antenna panel 517 while measuring signal characteristics of a signal detected over second antenna panel 519, and vice versa—e.g., when UE 515 performs a concurrent data reception and receive beam search. In some cases, UE 515 demodulates and decodes both of the signals detected over first antenna panel 517 and second antenna panel 519—e.g., when UE 515 receives a carrier aggregated transmission or simultaneous spatially-diverse transmissions. In some cases, UE 515 measures signal characteristics of both of the signals detected over first antenna panel 517 and second antenna panel 519—e.g., when UE 515 performs a dual receive beam search or when base station 505 performs an accelerated transmit beam sweep. In some cases, UE 515 reports beam feedback information (e.g., channel quality information) for a first transmit beam used for a first transmission and beam feedback information for a second transmit beam used for a simultaneous second transmission received at UE 515. In some cases, UE 515 combines both of the signals detected over first antenna panel 517 and second antenna panel 519—e.g., UE 515 receives a transmission transmitted using transmit diversity (when the multiple transmissions contain the same data).

At block 555, if UE 515 determines that a signal detected at second antenna panel 519 has superior channel qualities relative to the signal detected at first antenna panel 517, UE 415 may select second antenna panel 519 for receiving the transmission and/or subsequent transmissions—e.g., when UE 515 performs antenna selection.

At block 560, if UE 515 determines that a signal received over second antenna panel 519 has superior channel qualities relative to the signal received over first antenna panel 517, UE 515 may select the second receive beam associated with second antenna panel 519 for receiving subsequent transmissions—e.g., when UE 515 performs receive beam selection. In some cases, UE 515 may reconfigure first antenna panel 517 to receive via the second receive beam for subsequent transmissions. In other cases, UE 515 may receive the subsequent transmissions over second antenna panel 519—e.g., because second antenna panel 519 is already configured to receive via the second receive beam.

Figure 6:
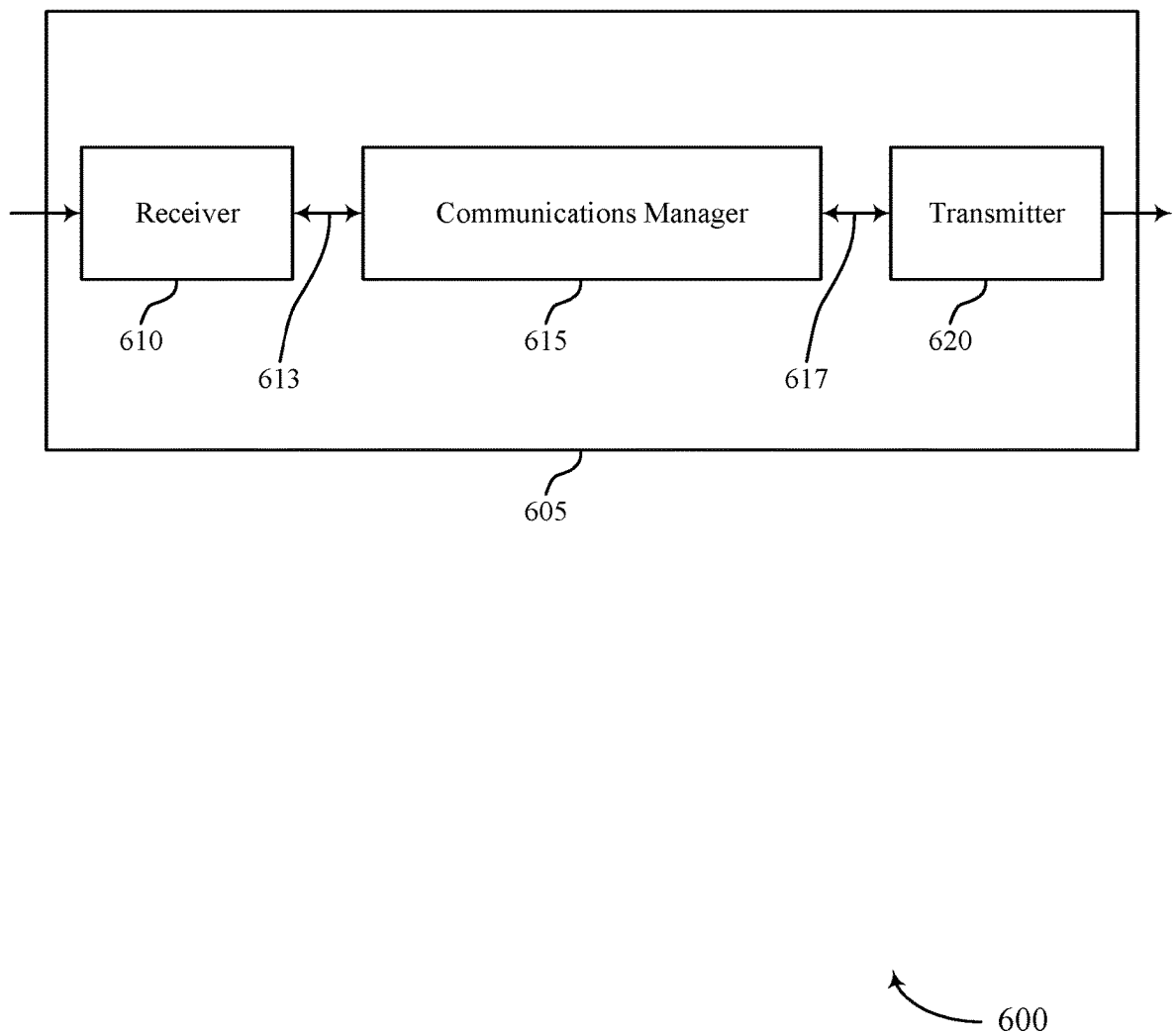
FIG. 6 shows a block diagram of a device that support beam capability enhancements using multiple receive ports in accordance with aspects of the present disclosure.

FIG. 6 shows a block diagram 600 of a device 605 that supports beam capability enhancements using multiple receive ports in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam capability enhancements using multiple receive ports, etc.). Information may be passed on to other components of the device 605. The receiver 610 may utilize a single antenna or antenna set. In some cases, the receiver 610 may pass detected signal 613 detected at a first antenna panel and a second antenna panel to communications manager 615.

The communications manager 615 may receive, using a first receive port, a first signal within a first frequency band, where the first receive port is associated with a first receive beam. The communications manager 615 may also receive, using a second receive port, a second signal within the first frequency band concurrently with receiving the first signal using the first receive port, where the second receive port is associated with a second receive beam. The communications manager 615 may also process the first signal received using the first receive port and the second signal received using the second receive port. In some cases, the communications manager 615 may pass control signaling 617 (e.g., a capability indication, channel state information, beam feedback, etc.) to transmitter 620.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. The transmitter 620 may utilize a single antenna or antenna set.

Figure 7:
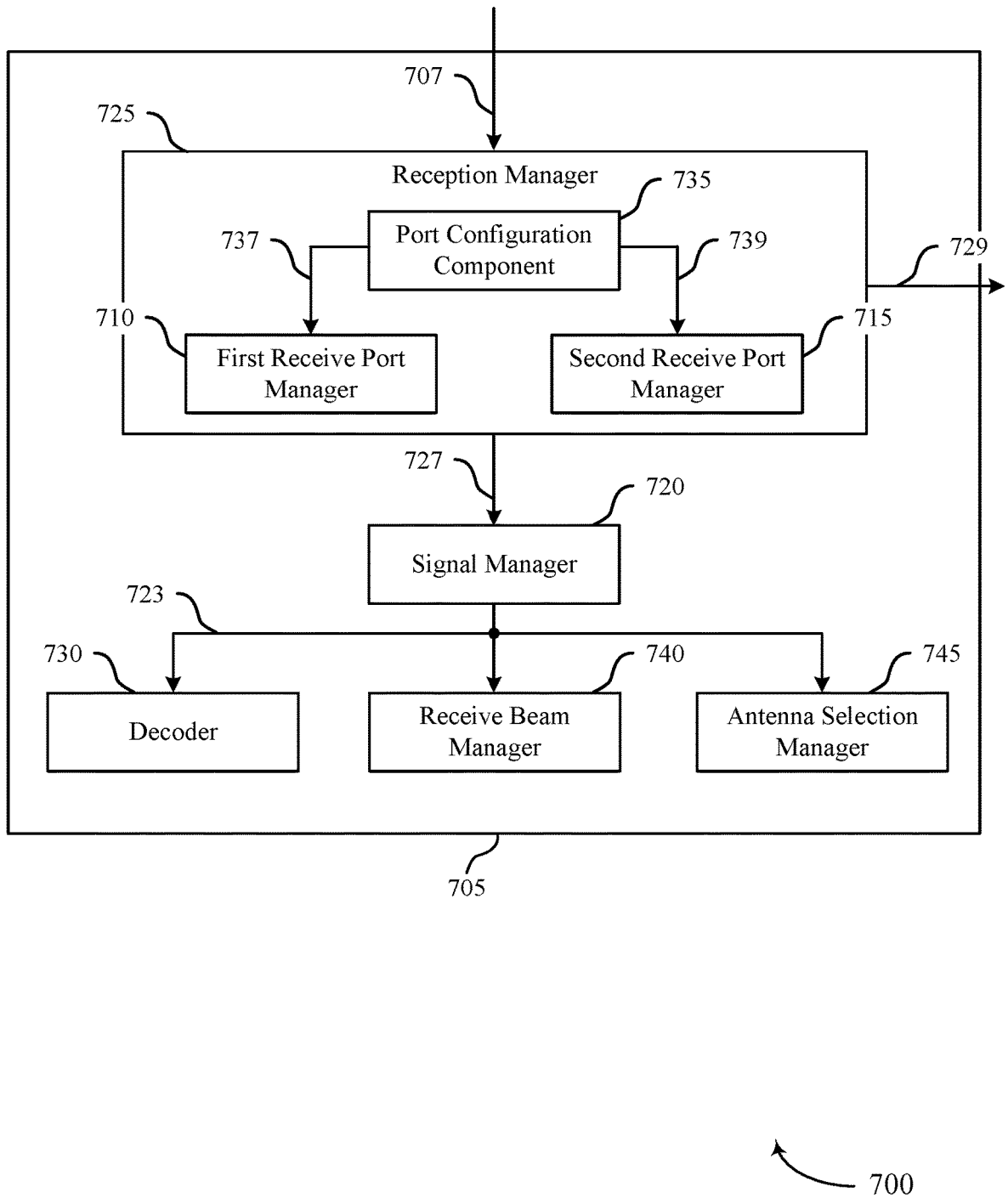
FIG. 7 shows a block diagram of a communications manager that supports beam capability enhancements using multiple receive ports in accordance with aspects of the present disclosure.

FIG. 7 shows a block diagram 700 of a communications manager 705 that supports beam capability enhancements using multiple receive ports in accordance with aspects of the present disclosure. The communications manager 705 may be an example of aspects of a communications manager 615, as described with reference to FIG. 6. The communications manager 705 may include a first receive port manager 710, a second receive port manager 715, a signal manager 720, a reception manager 725, a decoder 730, a port configuration component 735, a receive beam manager 740, and an antenna selection manager 745. Each of these modules may communicate, directly or indirectly, with one another (e.g., via one or more buses).

The first receive port manager 710 may receive, using a first receive port, a first signal within a first frequency band, where the first receive port is associated with a first receive beam.

The second receive port manager 715 may receive, using a second receive port, a second signal within the first frequency band concurrently with receiving the first signal using the first receive port, where the second receive port is associated with a second receive beam. In some cases, the first receive port is configured to receive vertically polarized signals and the second receive port is configured to receive horizontally polarized signals. In some cases, the first receive port is coupled with a first antenna panel configured to form the first receive beam and the second receive port is coupled with a second antenna panel configured to form the second receive beam.

In some examples, the reception manager 725 may receive one or more transmissions 707 transmitted from another wireless device. In some examples, the reception manager 725 may receive, from a base station, a configuration for a transmission within the first frequency band, the first signal and the second signal corresponding to the transmission. In some examples, the reception manager 725 may receive, from a base station, a first configuration for a first transmission within the first frequency band and a second configuration for a second transmission within the first frequency band, where the first signal corresponds to the first transmission and the second signal corresponds to the second transmission. In some examples, the reception manager 725 may determine that the UE is configured to receive communications over or one or more component carriers within the first frequency band. In some cases, the first transmission is transmitted over a first component carrier and the second transmission is transmitted over a second component carrier. In some cases, the first transmission is transmitted over first resources and the second transmission is transmitted over second resources that at least partially overlap with the first resources. In some examples, the reception manager 725 may receive a set of transmissions from a base station over a set of receive beams, the first signal and the second signal corresponding to transmissions of the set of transmissions and the set of receive beams including the first receive beam and the second receive beam. In some examples, the reception manager 725 may relay detected signals 727 using first and second receive port to the signal manager 720.

In some examples, the reception manager 725 may transmit (e.g., using a transmitter), to a base station, a capability indication 729 indicating that the UE supports receiving over multiple receive beams. The capability indication 729 may convey that the UE supports receiving over multiple receive beams within multiple frequency bands, or within a single frequency band, or both.

The port configuration component 735 may configure the second receive port to be coupled with the first local oscillator based on determining that the UE is configured to receive communications over or one or more component carriers within the first frequency band. In some examples, the port configuration component 735 may configure the first receive port and a third receive port to receive communications within the first frequency band. In some examples, the port configuration component 735 may configure the second receive port and a fourth receive port to receive communications within a second frequency band. In some examples, the port configuration component 735 may configure the second receive port and the fourth receive port to receive communications within the first frequency band based on determining that the UE is configured to receive communications over or one or more component carriers within the first frequency band.

In some examples, the port configuration component 735 may receive an indication from a base station to configure the first receive port and the third receive port to receive communications within the first frequency band, where the first receive port and the third receive port are configured to receive communications within the first frequency band based on the indication. In some cases, port configuration component 735 may transmit first control signaling 737 and second control signaling 739 to first receive port manager 710 and second receive port manager 715 indicating a configuration of the first and second receive ports. In some cases, first control signaling 737 may indicate which frequency band the first receive port is configured for and second control signaling 739 may indicate which frequency band the second receive port is configured for.

The signal manager 720 may process (e.g., downconvert, filter, attenuate, etc.) the first signal received using the first receive port and the second signal received using the second receive port. The signal manager 720 may pass processed signals 723 to decoder 730, receive beam manager 740, and/or antenna selection manager 745. In some examples, the decoder 730 may decode the first signal received using the first receive port via the first receive beam. In some examples, the decoder 730 may generate first data based on decoding the first signal. In some examples, the decoder 730 may generate first data and second data based on decoding the first signal and the second signal. In some examples, the signal manager 720 may combine the first signal and the second signal into a combined signal. In some examples, the decoder 730 may decode the combined signal.

In some examples, the receive beam manager 740 may perform, using the second receive port concurrently with receiving a set of signals using the first receive port, a search of a set of receive beams for receiving transmissions within the first frequency band, where the set of signals include the first signal, and where the second signal is received using the second receive port during the search. In some examples, the receive beam manager 740 may measure first channel state information for a first set of signals that correspond to the set of transmissions and are received using the first receive port via a first subset of the set of receive beams, where the first set of signals include the first signal, and where the first subset of the set of receive beams include the first receive beam.

In some examples, the receive beam manager 740 may measure channel state information for the second signal received using the second receive port via the second receive beam. In some cases, the receive beam manager 740 may measure first channel state information for the first signal and second channel state information for the second signal. In some examples, the receive beam manager 740 may measure second channel state information for a second set of signals that correspond to the set of transmissions and are received using the second receive port via a second subset of the set of receive beams, where the second set of signals include the second signal, and where the second subset of the set of receive beams include the second receive beam.

In some examples, the receive beam manager 740 may select a receive beam of the set of receive beams for receiving subsequent transmissions from the base station based on the measuring. In some examples, the reception manager 725 may receive, using the first receive port or the second receive port via the receive beam, a subsequent transmission from the base station based on the selecting.

In some examples, the receive beam manager 740 may select two receive beams of the set of receive beams for receiving subsequent transmissions from the base station based on the measuring. In some examples, the first receive port manager 710 may receive, using the first receive port via one of the two receive beams, a subsequent first transmission from the base station based on the selecting. In some examples, the second receive port manager 715 may receive, using the second receive port via the other one of the two receive beams, a subsequent second transmission from the base station based on the selecting.

In some examples, the receive beam manager 740 may select the first receive beam for receiving subsequent transmissions from the base station based on the measuring. In some examples, the reception manager 725 may receive, using the first receive port or the second receive port via the first receive beam, a subsequent transmission from the base station based on the selecting.

In some examples, the receive beam manager 740 may select the second receive beam for receiving subsequent transmissions from the base station based on the measuring. In some examples, the second receive port manager 715 may receive, using the second receive port via the second receive beam, a subsequent transmission from the base station based on the selecting. In some examples, the reception manager 725 may receive, using the first receive port or the second receive port via the second receive beam, a subsequent transmission from the base station based on the selecting.

In some cases, the antenna selection manager 745 may measure first channel state information for the first signal and second channel state information for the second signal. In some examples, the antenna selection manager 745 may select the second receive port for receiving the transmission from the base station based on the measuring.

Figure 8:
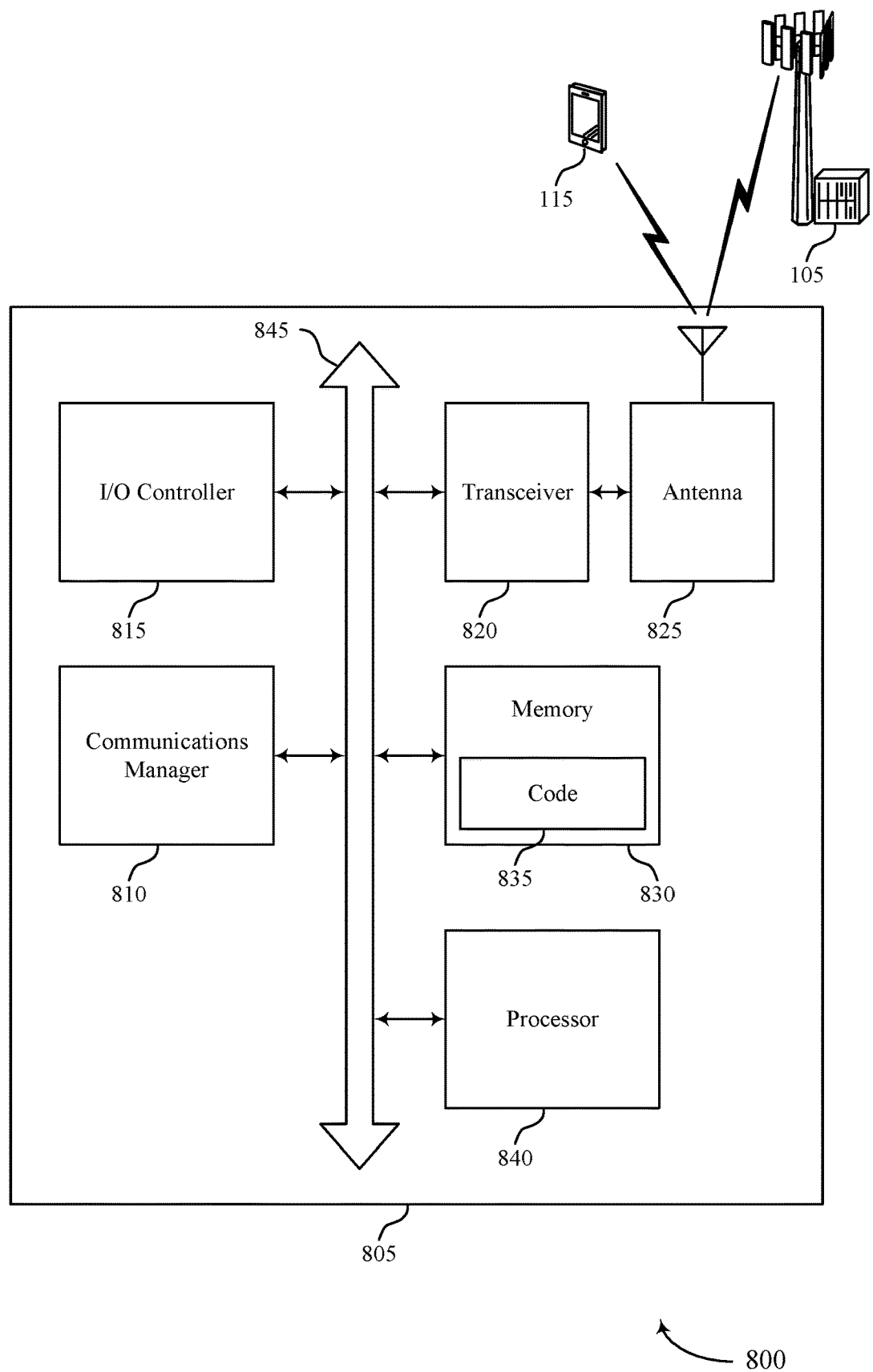
FIG. 8 shows a diagram of a system including a device that supports beam capability enhancements using multiple receive ports in accordance with aspects of the present disclosure.

FIG. 8 shows a diagram of a system 800 including a device 805 that supports beam capability enhancements using multiple receive ports in accordance with aspects of the present disclosure. The device 805 may be an example of or include the components of device 605 of FIG. 6 or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may be an example of communications manager 615 or communications manager 705, as described with reference to FIGS. 6 and 7.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam capability enhancements using multiple receive ports).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
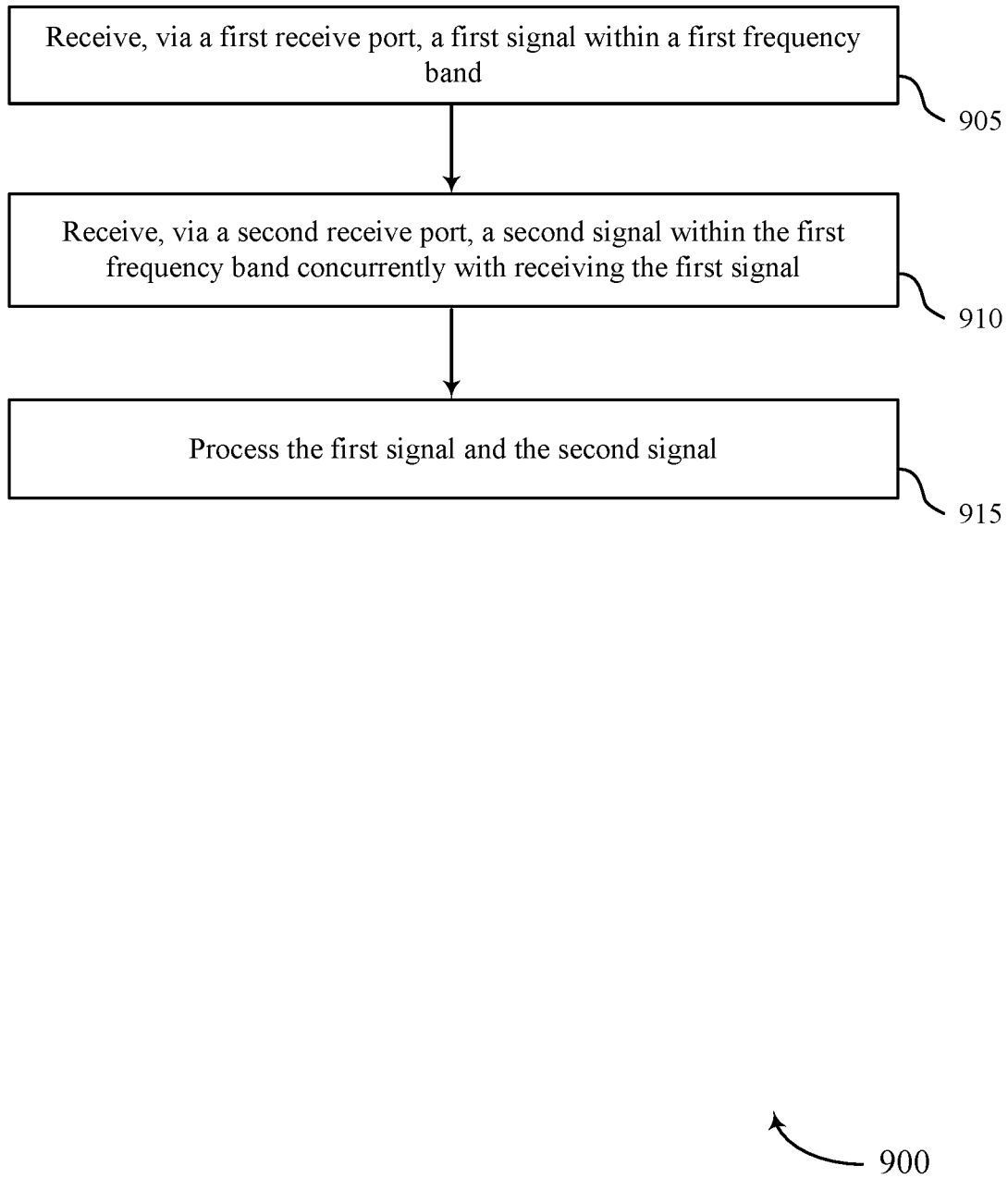
FIGS. 9 through 12 show flowcharts illustrating methods that support beam capability enhancements using multiple receive ports in accordance with aspects of the present disclosure.

FIG. 9 shows a flowchart illustrating a method 900 that supports beam capability enhancements using multiple receive ports in accordance with aspects of the present disclosure. The operations of method 900 may be implemented by a UE 115 or its components as described herein. For example, the operations of method 900 may be performed by a communications manager as described with reference to FIGS. 6 through 8. In some examples, a UE may execute a set of instructions to control the functional elements of the UE to perform the functions described below. Additionally, or alternatively, a UE may perform aspects of the functions described below using special-purpose hardware.

At 905, the UE may receive, using a first receive port, a first signal within a first frequency band, where the first receive port is associated with a first receive beam. In some cases, receiving the first signal using the first receive port may include monitoring particular time and frequency resources and detecting a signal at a first antenna panel coupled with the first receive port during the monitored time and frequency resources. In some examples, the first antenna panel may be configured to form the first receive beam. After detecting the first signal, the first antenna panel may signal the detected first signal to the first receive port. The operations of 905 may be performed according to the methods described herein. In some examples, aspects of the operations of 905 may be performed by a first receive port manager as described with reference to FIGS. 6 through 8.

At 910, the UE may receive, using a second receive port, a second signal within the first frequency band concurrently with receiving the first signal using the first receive port, where the second receive port is associated with a second receive beam. In some cases, receiving the second signal using the second receive port may include monitoring the particular time and frequency resources and detecting a signal at a second antenna panel coupled with the first receive port during the monitored time and frequency resources. In some examples, the second antenna panel may be configured to form the second receive beam. After detecting the first signal, the first antenna panel may signal the detected first signal to the first receive port. In some cases, the UE configures the second receive port to receive communications over the first frequency band after determining that the UE is configured to perform communication within a single frequency band—e.g., after determining that a modem at the UE is configured for communications in a single frequency band or that the network has configured the UE for communications in a single frequency band. The operations of 910 may be performed according to the methods described herein. In some examples, aspects of the operations of 910 may be performed by a second receive port manager as described with reference to FIGS. 6 through 8.

At 915, the UE may process the first signal received using the first receive port and the second signal received using the second receive port. Processing the first and second signal may include decoding the first and second signal, measuring characteristics of the first and second signal, or any combination thereof. For example, in some cases, processing the first and second signal includes decoding the first signal to obtain first data and the second signal to obtain second data. In some examples, processing the first and second signal includes decoding the first signal to obtain first data and measuring characteristics of the second signal (e.g., measuring channel state information). In some examples, processing the first and second signal includes measuring characteristics of the first signal and the second signal. In some cases, the measured signal characteristics may be used to identify a preferred receive beam or a preferred antenna for receiving current or subsequent transmissions. The operations of 915 may be performed according to the methods described herein. In some examples, aspects of the operations of 915 may be performed by a signal manager, decoder, receive beam manager, and/or antenna selection manger as described with reference to FIGS. 6 through 8.

Figure 10:
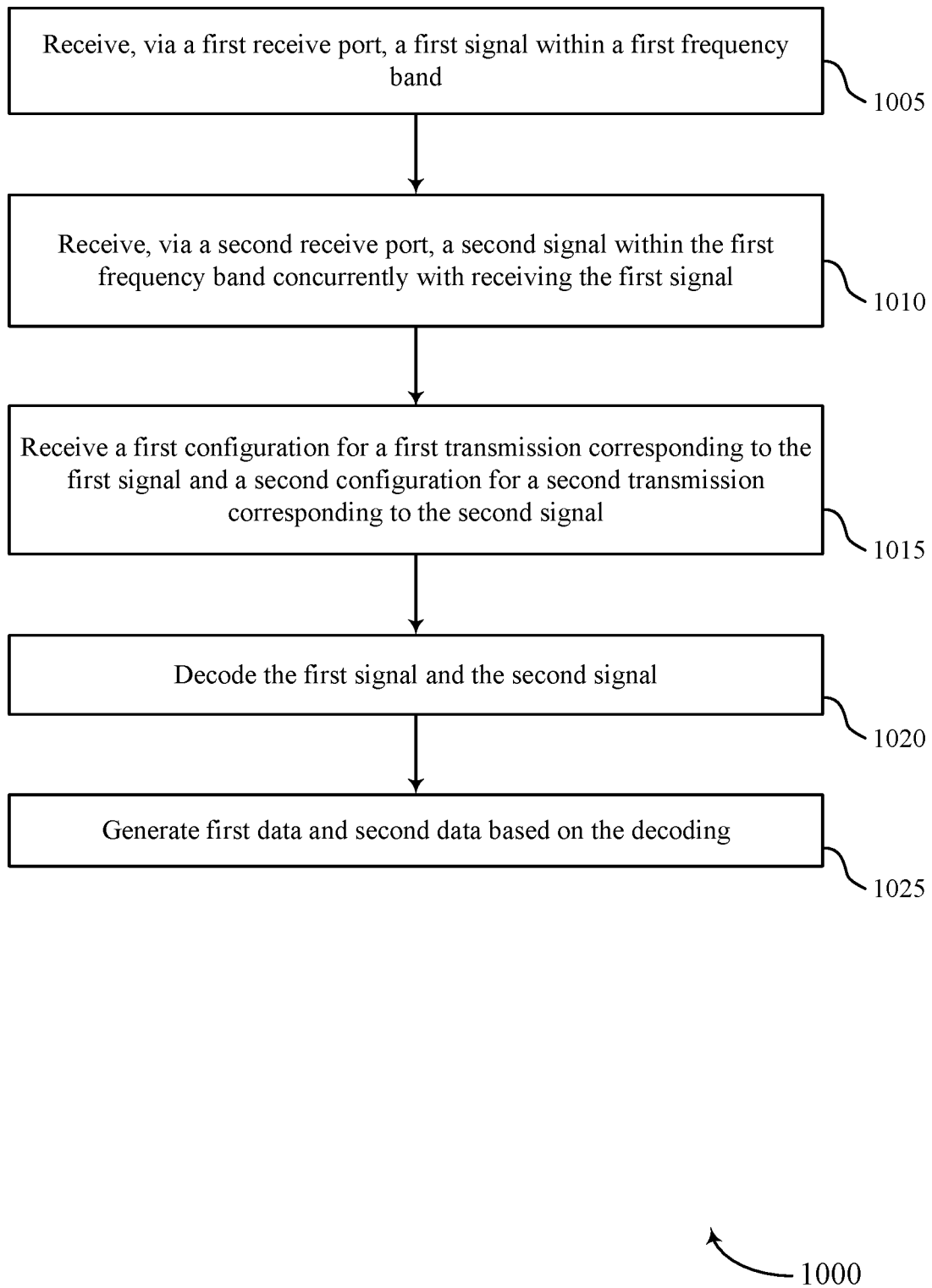

FIG. 10 shows a flowchart illustrating a method 1000 that supports beam capability enhancements using multiple receive ports in accordance with aspects of the present disclosure. The operations of method 1000 may be implemented by a UE 115 or its components as described herein. For example, the operations of method 1000 may be performed by a communications manager as described with reference to FIGS. 6 through 8. In some examples, a UE may execute a set of instructions to control the functional elements of the UE to perform the functions described below. Additionally, or alternatively, a UE may perform aspects of the functions described below using special-purpose hardware.

At 1005, the UE may receive, using a first receive port, a first signal within a first frequency band, where the first receive port is associated with a first receive beam. Receiving the first signal may include monitoring particular time and frequency resources and detecting a signal at a first antenna panel coupled with the first receive port during the monitored time and frequency resources. The operations of 1005 may be performed according to the methods described herein. In some examples, aspects of the operations of 1005 may be performed by a first receive port manager as described with reference to FIGS. 6 through 8.

At 1010, the UE may receive, using a second receive port, a second signal within the first frequency band concurrently with receiving the first signal using the first receive port, where the second receive port is associated with a second receive beam. Receiving the second signal may include monitoring the particular time and frequency resources and detecting a signal at a second antenna panel coupled with the first receive port during the monitored time and frequency resources. The operations of 1010 may be performed according to the methods described herein. In some examples, aspects of the operations of 1010 may be performed by a second receive port manager as described with reference to FIGS. 6 through 8.

At 1015, the UE may receive, from a base station, a first configuration for a first transmission within the first frequency band and a second configuration for a second transmission within the first frequency band, where the first signal corresponds to the first transmission and the second signal corresponds to the second transmission. In some cases, the configuration is received in RRC and/or control signaling. The operations of 1015 may be performed according to the methods described herein. In some examples, aspects of the operations of 1015 may be performed by a reception manager as described with reference to FIGS. 6 through 8.

At 1020, the UE may demodulate and/or decode the first signal and the second signal. The operations of 1020 may be performed according to the methods described herein. In some examples, aspects of the operations of 1020 may be performed by a decoder as described with reference to FIGS. 6 through 8.

At 1025, the UE may generate first data and second data based on decoding the first signal and the second signal. The operations of 1025 may be performed according to the methods described herein. In some examples, aspects of the operations of 1025 may be performed by a decoder as described with reference to FIGS. 6 through 8.

Figure 11:
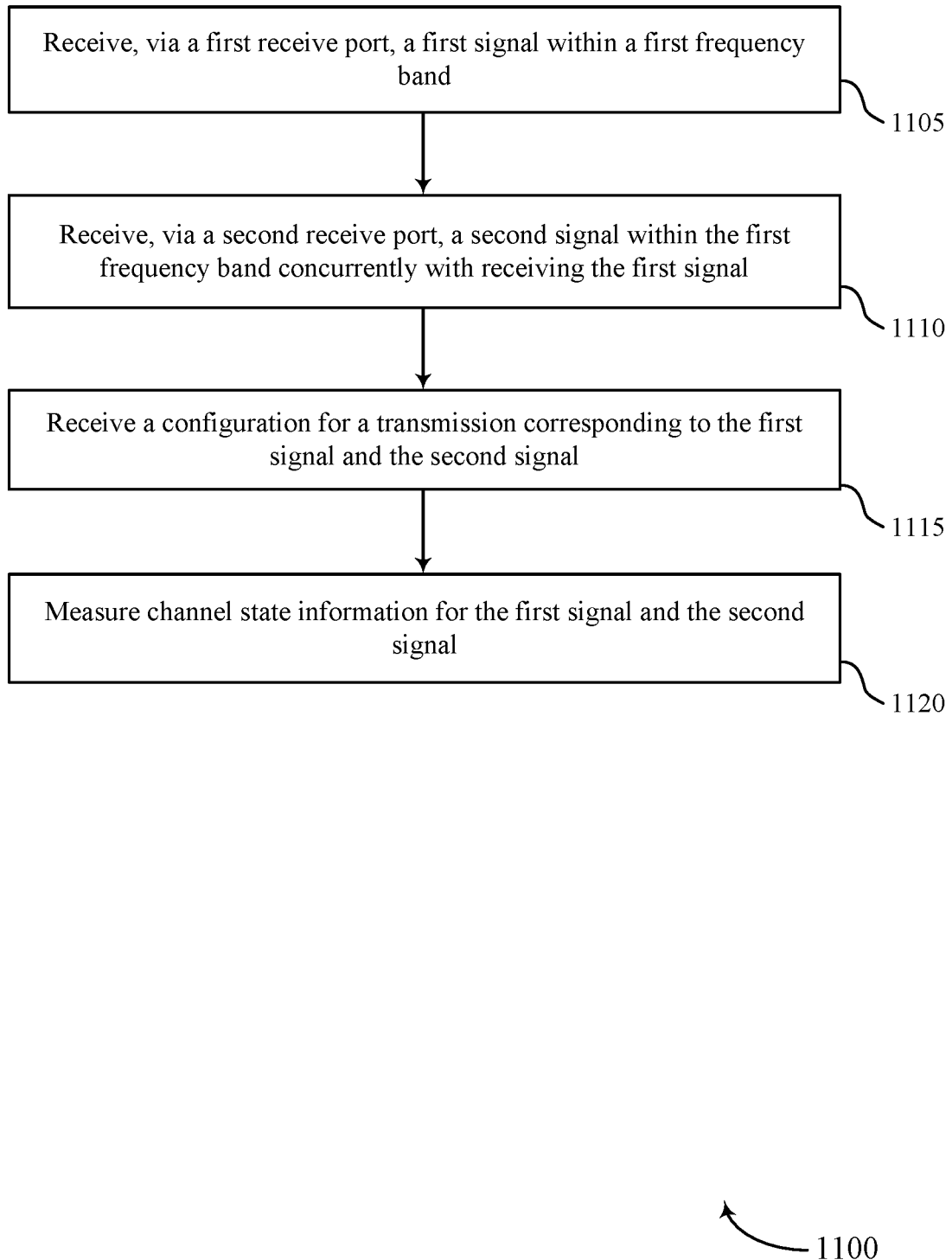

FIG. 11 shows a flowchart illustrating a method 1100 that supports beam capability enhancements using multiple receive ports in accordance with aspects of the present disclosure. The operations of method 1100 may be implemented by a UE 115 or its components as described herein. For example, the operations of method 1100 may be performed by a communications manager as described with reference to FIGS. 6 through 8. In some examples, a UE may execute a set of instructions to control the functional elements of the UE to perform the functions described below. Additionally, or alternatively, a UE may perform aspects of the functions described below using special-purpose hardware.

At 1105, the UE may receive, using a first receive port, a first signal within a first frequency band, where the first receive port is associated with a first receive beam. Receiving the first signal may include monitoring particular time and frequency resources and detecting a signal at a first antenna panel coupled with the first receive port during the monitored time and frequency resources. The operations of 1105 may be performed according to the methods described herein. In some examples, aspects of the operations of 1105 may be performed by a first receive port manager as described with reference to FIGS. 6 through 8.

At 1110, the UE may receive, using a second receive port, a second signal within the first frequency band concurrently with receiving the first signal using the first receive port, where the second receive port is associated with a second receive beam. Receiving the second signal may include monitoring the particular time and frequency resources and detecting a signal at a second antenna panel coupled with the first receive port during the monitored time and frequency resources. The operations of 1110 may be performed according to the methods described herein. In some examples, aspects of the operations of 1110 may be performed by a second receive port manager as described with reference to FIGS. 6 through 8.

At 1115, the UE may receive, from a base station, a configuration for a transmission within the first frequency band, the first signal and the second signal corresponding to the transmission. In some cases, the configuration is received in RRC and/or control signaling. The operations of 1115 may be performed according to the methods described herein. In some examples, aspects of the operations of 1115 may be performed by a reception manager as described with reference to FIGS. 6 through 8.

At 1120, the UE may measure first channel state information for the first signal and second channel state information for the second signal. Measuring channel state information may include computing a signal-to-noise ratio and/or phase information for a detected signal. The operations of 1120 may be performed according to the methods described herein. In some examples, aspects of the operations of 1120 may be performed by a receive beam manager as described with reference to FIGS. 6 through 8.

Figure 12:
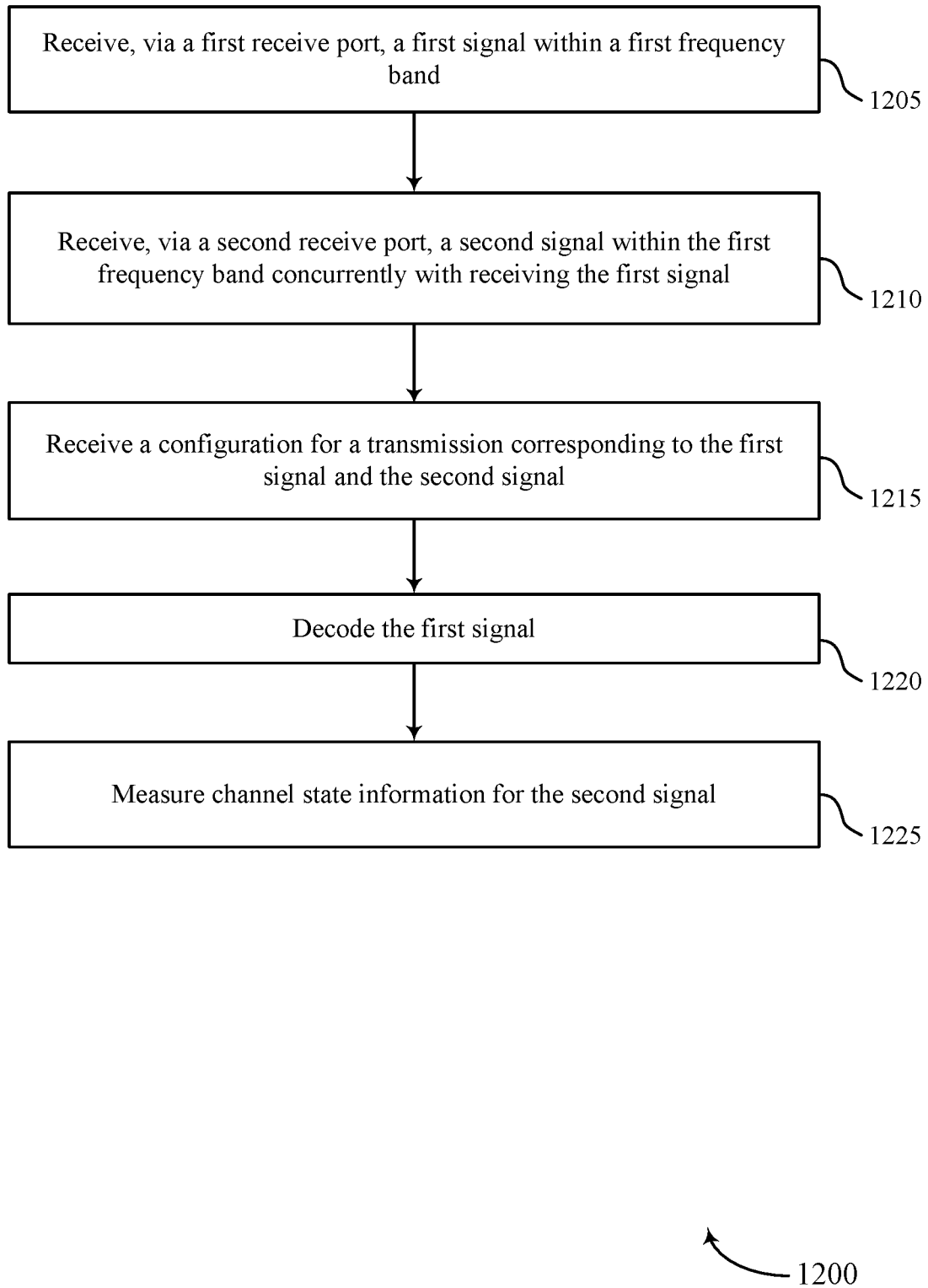

FIG. 12 shows a flowchart illustrating a method 1200 that supports beam capability enhancements using multiple receive ports in accordance with aspects of the present disclosure. The operations of method 1200 may be implemented by a UE 115 or its components as described herein. For example, the operations of method 1200 may be performed by a communications manager as described with reference to FIGS. 6 through 8. In some examples, a UE may execute a set of instructions to control the functional elements of the UE to perform the functions described below. Additionally, or alternatively, a UE may perform aspects of the functions described below using special-purpose hardware.

At 1205, the UE may receive, using a first receive port, a first signal within a first frequency band, where the first receive port is associated with a first receive beam. Receiving the first signal may include monitoring particular time and frequency resources and detecting a signal at a first antenna panel coupled with the first receive port during the monitored time and frequency resources. The operations of 1205 may be performed according to the methods described herein. In some examples, aspects of the operations of 1205 may be performed by a first receive port manager as described with reference to FIGS. 6 through 8.

At 1210, the UE may receive, using a second receive port, a second signal within the first frequency band concurrently with receiving the first signal using the first receive port, where the second receive port is associated with a second receive beam. Receiving the second signal may include monitoring the particular time and frequency resources and detecting a signal at a second antenna panel coupled with the first receive port during the monitored time and frequency resources. The operations of 1210 may be performed according to the methods described herein. In some examples, aspects of the operations of 1210 may be performed by a second receive port manager as described with reference to FIGS. 6 through 8.

At 1215, the UE may receive, from a base station, a configuration for a transmission within the first frequency band, where the first signal and the second signal corresponding to the transmission. In some cases, the configuration is received in RRC and/or control signaling. The operations of 1215 may be performed according to the methods described herein. In some examples, aspects of the operations of 1215 may be performed by a reception manager as described with reference to FIGS. 6 through 8.

At 1220, the UE may demodulate and/or decode the first signal received using the first receive port via the first receive beam. The operations of 1220 may be performed according to the methods described herein. In some examples, aspects of the operations of 1220 may be performed by a decoder as described with reference to FIGS. 6 through 8.

At 1225, the UE may measure channel state information for the second signal received using the second receive port via the second receive beam. Measuring channel state information may include computing a signal-to-noise ratio and/or phase information for a detected signal. The operations of 1225 may be performed according to the methods described herein. In some examples, aspects of the operations of 1225 may be performed by a receive beam manager as described with reference to FIGS. 6 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
configuring a second receive port and a fourth receive port to receive communications within a first frequency band based at least in part on the UE being configured to receive communications over one or more component carriers within the first frequency band, wherein a first receive port and a third receive port are configurable to receive communications within the first frequency band or a second frequency band, and wherein the second receive port and the fourth receive port are configurable to receive communications within the first frequency band or the second frequency band;
receiving, using the first receive port, a plurality of signals comprising a first signal within the first frequency band, wherein the first receive port is associated with a first receive beam;
performing, using the second receive port concurrently with receiving the plurality of signals using the first receive port, a search of a plurality of receive beams for receiving transmissions within the first frequency band, wherein a second signal is received over a second receive beam using the second receive port during the search; and
processing the first signal received using the first receive port and the second signal received using the second receive port.

2. The method of claim 1, further comprising:
transmitting, to a base station, an indication that the UE supports receiving over multiple receive beams.

3. The method of claim 1, further comprising:
receiving, from a base station, a first configuration for a first transmission within the first frequency band and a second configuration for a second transmission within the first frequency band, wherein the first signal corresponds to the first transmission and the second signal corresponds to the second transmission.

4. The method of claim 3, wherein the processing comprises decoding the first signal and the second signal, the method further comprising:
generating first data and second data based at least in part on decoding the first signal and the second signal.

5. The method of claim 3, wherein the first transmission is transmitted over a first component carrier and the second transmission is transmitted over a second component carrier.

6. The method of claim 1, wherein the second receive port is couplable with a first local oscillator for receiving communications over the first frequency band or a second local oscillator for receiving communications over the second frequency band, the method further comprising:
configuring the second receive port to be coupled with the first local oscillator based at least in part on the UE being configured to receive communications over the one or more component carriers within the first frequency band.

7. The method of claim 1, further comprising:
receiving an indication from a base station to configure the first receive port and the third receive port to receive communications within the first frequency band, wherein the first receive port and the third receive port are configured to receive communications within the first frequency band based at least in part on the indication.

8. The method of claim 1, wherein the first receive port is configured to receive vertically polarized signals and the second receive port is configured to receive horizontally polarized signals.

9. The method of claim 1, wherein the first receive port is coupled with a first antenna panel configured to form the first receive beam and the second receive port is coupled with a second antenna panel configured to form the second receive beam.

10. The method of claim 1, further comprising receiving, from a base station, a configuration for a transmission within the first frequency band, the first signal and the second signal corresponding to the transmission; and
wherein the processing comprises measuring first channel state information for the first signal and second channel state information for the second signal.

11. The method of claim 10, further comprising:
selecting the first receive beam for receiving subsequent transmissions from the base station based at least in part on the measuring; and
receiving, over the first receive port or the second receive port via the first receive beam, a subsequent transmission from the base station based at least in part on the selecting.

12. The method of claim 10, further comprising:
selecting the second receive beam for receiving subsequent transmissions from the base station based at least in part on the measuring; and
receiving, over the first receive port or the second receive port via the second receive beam, a subsequent transmission from the base station based at least in part on the selecting.

13. The method of claim 1, further comprising:
receiving a plurality of transmissions from a base station over the plurality of receive beams, the plurality of signals corresponding to transmissions of the plurality of transmissions, the second signal corresponding to a transmission of the plurality of transmissions, and the plurality of receive beams comprising the first receive beam and the second receive beam; and
wherein the processing comprises:
measuring first channel state information for the plurality of signals that correspond to the plurality of transmissions and are received over the first receive port via a first subset of the plurality of receive beams, wherein the first subset of the plurality of receive beams comprise the first receive beam; and
measuring second channel state information for a second plurality of signals that correspond to the plurality of transmissions and are received over the second receive port via a second subset of the plurality of receive beams, wherein the second plurality of signals comprise the second signal, and wherein the second subset of the plurality of receive beams comprise the second receive beam.

14. The method of claim 13, further comprising:
selecting a receive beam of the plurality of receive beams for receiving subsequent transmissions from the base station based at least in part on the measuring; and
receiving, over the first receive port or the second receive port via the receive beam, a subsequent transmission from the base station based at least in part on the selecting.

15. The method of claim 13, further comprising:
selecting two receive beams of the plurality of receive beams for receiving subsequent transmissions from the base station based at least in part on the measuring;

receiving, over the first receive port via one of the two receive beams, a subsequent first transmission from the base station based at least in part on the selecting; and
receiving, over the second receive port via the other one of the two receive beams, a subsequent second transmission from the base station based at least in part on the selecting.

16. The method of claim 1 further comprising:
receiving, from a base station, a configuration for a transmission within the first frequency band, wherein the first signal and the second signal corresponding to the transmission, and wherein the processing comprises:
  decoding the first signal received over the first receive port via the first receive beam; and
  measuring channel state information for the second signal received over the second receive port via the second receive beam.

17. The method of claim 16, further comprising:
generating first data based at least in part on decoding the first signal;
selecting the second receive beam for receiving subsequent transmissions from the base station based at least in part on the measuring; and
receiving, over the first receive port or the second receive port via the second receive beam, a subsequent transmission from the base station based at least in part on the selecting.

18. The method of claim 1, wherein the first signal corresponds to a horizontally polarized version of a transmission from a base station and the second signal corresponds to a vertically polarized version of the transmission; and
  wherein the processing comprises measuring first channel state information for the first signal and second channel state information for the second signal.

19. The method of claim 18, further comprising:
selecting the second receive port for receiving the transmission from the base station based at least in part on the measuring; and
receiving, over the second receive port via the second receive beam, a subsequent transmission from the base station based at least in part on the selecting.

20. An apparatus for wireless communication at a user equipment (UE), comprising:
  a first antenna panel configured to form a first receive beam and coupled with a first receive port and a third receive port that are configured for a first frequency band;
  a second antenna panel configured to form a second receive be am and coupled with a second receive port and a fourth receive port that are configured for a second frequency band;
  a processor,
  memory coupled with the processor; and
  instructions stored in the memory and executable by the processor to cause the apparatus to:
    receive a configuration to receive communications over one or more component carriers within the first frequency band;
    configure the second receive port and the fourth receive port to receive communications within the first frequency band via the second antenna panel based at least in part on receiving the configuration;
    receive a plurality of signals comprising a first signal within the first frequency band using the first receive port, wherein the first receive port is associated with a first receive beam;
    perform, concurrently with receiving the plurality of signals using the first receive port, a search of a plurality of receive beams for receiving transmissions within the first frequency band, wherein a second signal is received over the second receive beam using the second receive port during the search; and
    process the first signal received using the first receive port and the second signal received using the second receive port.

21. The apparatus of claim 20,
wherein the instructions are further executable by the processor to cause the apparatus to:
  transmit, to a base station, an indication that the UE supports receiving over multiple receive beams.

22. The apparatus of claim 20, further comprising:
a first local oscillator tuned for the first frequency band, wherein the first receive port and second receive port are coupled with the first local oscillator;
a second local oscillator tuned for the second frequency band, wherein the third receive port and fourth receive port are coupled with the second local oscillator, and wherein the instructions for configuring the second receive port and the fourth receive port to receive communications within the first frequency band are further executable by the processor to cause the apparatus to:
  couple the first local oscillator with the third receive port and the fourth receive port.

23. The apparatus of claim 20, wherein the instructions are further executable by the processor to cause the apparatus to:
  receive, from a base station, a configuration for a transmission within the first frequency band, the first signal and the second signal corresponding to the transmission; and
  measure first channel state information for the first signal and second channel state information for the second signal.

24. The apparatus of claim 20, wherein the instructions are further executable by the processor to cause the apparatus to:
  receive, from a base station, a first configuration for a first transmission within the first frequency band and a second configuration for a second transmission within the first frequency band, wherein the first signal corresponds to the first transmission and the second signal corresponds to the second transmission; and
  generate first data and second data based at least in part on decoding the first signal and the second signal.

25. An apparatus for wireless communication at a user equipment (UE), comprising:
  means for configuring a second receive port and a fourth receive port to receive communications within a first frequency band based at least in part on the UE being configured to receive communications over one or more component carriers within the first frequency band, wherein a first receive port and a third receive port are configurable to receive communications within the first frequency band or a second frequency band, and wherein the second receive port and the fourth receive port are configurable to receive communications within the first frequency band or the second frequency band;

means for receiving, using the first receive port, a plurality of signals comprising a first signal within the first frequency band, wherein the first receive port is associated with a first receive beam;

means for performing, using the second receive port concurrently with receiving the plurality of signals using the first receive port, a search of a plurality of receive beams for receiving transmissions within the first frequency band, wherein a second signal is received over a second receive beam using the second receive port during the search; and means for processing the first signal received using the first receive port and the second signal received using the second receive port.

26. A non-transitory computer-readable medium storing code for wireless communication at a user equipment (UE), the code comprising instructions executable by a processor to:

configure a second receive port and a fourth receive port to receive communications within a first frequency band based at least in part on the UE being configured to receive communications over one or more component carriers within the first frequency band, wherein a first receive port and a third receive port are configurable to receive communications within the first frequency band or a second frequency band, and wherein the second receive port and the fourth receive port are configurable to receive communications within the first frequency band or the second frequency band;

receive, using the first receive port, a plurality of signals comprising a first signal within the first frequency band, wherein the first receive port is associated with a first receive beam;

perform, using the second receive port concurrently with receiving the plurality of signals using the first receive port, a search of a plurality of receive beams for receiving transmissions within the first frequency band, wherein a second signal is received over a second receive beam using the second receive port during the search; and process the first signal received using the first receive port and the second signal received using the second receive port.

* * * * *